(12) United States Patent
Minagawa et al.

(10) Patent No.: US 8,441,544 B2
(45) Date of Patent: May 14, 2013

(54) ELECTRONIC CAMERA AND MEDIUM STORING IMAGE PROCESSING PROGRAM FOR SKIN COLOR CORRECTION

(75) Inventors: Kazue Minagawa, Kawasaki (JP); Keiichi Nitta, Kawasaki (JP); Takeshi Nishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 268 days.

(21) Appl. No.: 12/692,152

(22) Filed: Jan. 22, 2010

(65) Prior Publication Data

US 2010/0188521 A1    Jul. 29, 2010

(30) Foreign Application Priority Data

Jan. 28, 2009  (JP) ................ 2009-016745
Jan. 20, 2010  (JP) ................ 2010-010162

(51) Int. Cl.
*H04N 5/228* (2006.01)
*G06K 9/34* (2006.01)

(52) U.S. Cl.
USPC ................ 348/222.1; 382/164

(58) Field of Classification Search ........... None
See application file for complete search history.

(56) References Cited

U.S. PATENT DOCUMENTS

| | | | |
|---|---|---|---|
| 5,347,371 A | 9/1994 | Nishimura et al. | |
| 6,678,407 B1 * | 1/2004 | Tajima | 382/167 |
| 6,975,759 B2 * | 12/2005 | Lin | 382/167 |
| 6,996,270 B1 | 2/2006 | Ito | |
| 7,548,260 B2 | 6/2009 | Yamaguchi | |
| 2004/0156544 A1 * | 8/2004 | Kajihara | 382/167 |
| 2008/0012956 A1 * | 1/2008 | Nihei et al. | 348/222.1 |

FOREIGN PATENT DOCUMENTS

| | | |
|---|---|---|
| JP | A-2005-128600 | 5/2005 |
| JP | A-2009-38737 | 2/2009 |

* cited by examiner

*Primary Examiner* — Albert Cutler
(74) *Attorney, Agent, or Firm* — Oliff & Berridge, PLC

(57) ABSTRACT

An electronic camera is characterized by including an imaging part shooting a figure image; an area detection part detecting a flesh-colored area including a face portion and a portion other than a face; a color judgment part judging color information of the flesh-colored area; a color difference calculation part determining a color difference between first color information of the face portion and second color information of the flesh-colored area of the portion other than the face; a correction coefficient calculation part determining color correction coefficients based on the color difference; an area appointment part appointing an area on which a color conversion is performed; and a color conversion part performing, when the color difference is equal to or greater than a predetermined value, the color conversion on the area appointed by the area appointment part by using the color correction coefficients.

7 Claims, 18 Drawing Sheets

Fig. 1 3 (a)
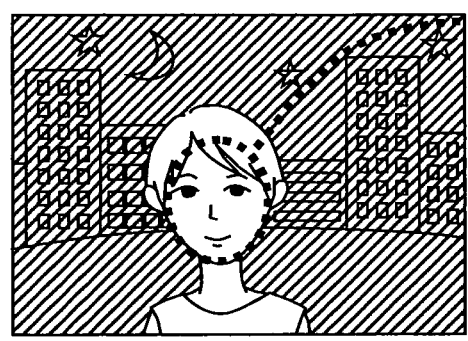
Fig. 1 3 (b)
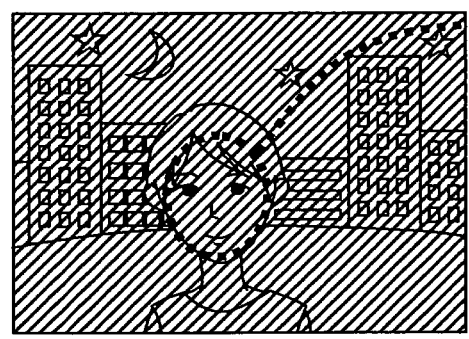
Fig. 1 3 (c)

ELECTRONIC CAMERA AND MEDIUM STORING IMAGE PROCESSING PROGRAM FOR SKIN COLOR CORRECTION

CROSS REFERENCE TO THE RELATED APPLICATIONS

This application is based upon and claims the benefit of priority from Japanese Patent Application No. 2009-016745 and Japanese Patent Application No. 2010-10162, filed on Jan. 28, 2009 and Jan. 20, 2010, respectively, the entire contents of which are incorporated herein by reference.

BACKGROUND

1. Field

The present application relates to an electronic camera and a medium storing an image processing program for performing flesh color correction.

2. Description of the Related Art

In recent years, electronic cameras have been widely used, and portrait shooting is performed in various scenes. In such portrait shooting, whether a flesh color of a shot person can be beautifully reproduced or not is a big concern to a shooting person and the shot person.

Accordingly, there has been studied a method of performing correction in accordance with a characteristic of each person, in order to beautifully shoot a face of a person (for instance, refer to Japanese Unexamined Patent Application Publication No. 2005-128600).

However, there is a problem such that if a person who puts on makeup using foundation and the like is shot with photoflash by an electronic camera, a face color of a person of the shot image becomes whiter than an impression given at the time of actually seeing the face color. In particular, there is a problem such that although the color of the face on which the foundation is put on becomes white, a portion on which the foundation is not put on such as a decollete portion (portion from the nape of the neck to around the breast) remains in a normal flesh color, so that a difference in color between the flesh color of the face and the flesh color of the decollete portion stands out, and the person seems to have an apparent heavy makeup. Further, even when the photoflash shooting is not performed, the difference in color between the flesh color of the face on which the foundation is put on and the flesh color of the decollete portion appears on a shot image, in which the face sometimes looks like a mask.

SUMMARY

A proposition of the present application is to provide an electronic camera and a medium storing an image processing program with which a natural figure image with a small difference in color between a flesh color of a face and a flesh color of a portion surrounding the face can be obtained.

An electronic camera according to the present embodiment is characterized by including an imaging part that shoots a figure image; an area detection part that detects, from the figure image shot by the imaging part, a flesh-colored area including a face portion and a portion other than a face; a color judgment part that judges color information of the flesh-colored area detected by the area detection part; a color difference calculation part that determines a color difference between first color information of the face portion and second color information of the flesh-colored area of the portion other than the face which are judged by the color judgment part; a correction coefficient calculation part that determines color correction coefficients based on the color difference determined by the color difference calculation part; an area appointment part that appoints an area on which a color conversion is performed; and a color conversion part that performs, when the color difference determined by the color difference calculation part is equal to or greater than a predetermined value at the time of performing the color conversion on the area appointed by the area appointment part, the color conversion on the area appointed by the area appointment part by using the color correction coefficients, wherein the color conversion part executes processing of the color conversion when a photoflash part is on, in which the photoflash part emits light at a time of shooting in the imaging part, and the correction coefficient calculation part performs, at a time of determining the color correction coefficients, the weighting on the color correction coefficients in accordance with a contribution degree with respect to the face portion when the photoflash part is luminous.

Further, preferably, the flesh-colored area other than the face from which the color judgment part judges the second color information is characterized to be an area surrounding a neck of a person.

Further, preferably, it is characterized in that there is further provided a color range judgment part that judges whether or not a hue of at least one of the first color information and the second color information is within a predetermined range, in which the color conversion part executes, in the case the photoflash part is on at the time of shooting by the imaging part, the processing of the color conversion if a judgment result of the color range judgment part indicates that the hue is within the predetermined range.

Further, preferably, the color judgment part is characterized to determine, in the case the photoflash part is on at the time of shooting by the imaging part, color information being high-frequency from a color distribution of the flesh-colored area other than the face at the time of judging the second color information, and to set the color information as the second information of the flesh-colored area other than the face.

Further, preferably, the correction coefficient calculation part is characterized to perform, at the time of determining the color correction coefficients, the weighting on the color correction coefficients in accordance with a contribution degree with respect to the face portion when the photoflash part is luminous.

A non-transitory computer-readable medium storing an image processing program according to the present embodiment being a program capable of being executed by a computer, characterized by including an imaging step shooting a figure image; an area detection step of detecting, from a figure image, a flesh-colored area including a face portion and a portion other than a face; a color judgment step of judging color information of the flesh-colored area detected in the area detection step; a color difference calculation step of determining a color difference between first color information of the face portion and second color information of the flesh-colored area of the portion other than the face which are judged in the color judgment step; a correction coefficient calculation step of determining color correction coefficients based on the color difference determined in the color difference calculation step; an area appointment step of appointing an area on which a color conversion is performed; a color conversion step of performing, when the color difference determined in the color difference calculation step is equal to or greater than a predetermined value at the time of performing the color conversion on the area appointed in the area appointment step, the color conversion on the area appointed in the area appointment step by using the color correction coefficients; and a storage step storing the color information of the flesh-colored area judged by the color judgement part with respect to the figure image previously shot by the imaging step as preset color information, wherein the color conversion step executes processing of the color conversion when a photoflash part is on, in which the photoflash part emits light at a time of shooting of the figure image, and the color difference calculation step determines a color difference between main shooting color information of a flesh-colored area and the preset color information stored in the storage part, the main shooting color information of the flesh colored area being judged by the color judgment step with respect to a figure image obtained through a main shooting in the imaging step.

An electronic camera according to another embodiment is characterized in that there is provided an imaging part that shoots a figure image; an area detection part that detects a flesh-colored area including a face portion and a portion other than a face from the figure image shot by the imaging part; a color judgment part that judges color information of the flesh-colored area detected by the area detection part; a color difference calculation part that determines a color difference between first color information of the face portion and second color information of the flesh-colored area of the portion other than the face which are judged by the color judgment part; a correction coefficient calculation part that determines color correction coefficients based on the color difference determined by the color difference calculation part; an area appointment part that appoints an area on which a color conversion is performed; a color conversion part that performs the color conversion on the area appointed by the area appointment part by using the color correction coefficients, when the color difference determined by the color difference calculation part is equal to or greater than a predetermined value at a time of performing the color conversion on the area appointed by the area appointment part; a storage part that stores the color information of the flesh-colored area judged by the color judgment part with respect to the figure image previously shot by the imaging part as preset color information; wherein the color conversion part executes processing of the color conversion when a photoflash part is on, in which the photoflash part emits light at a time of shooting in the imaging part; and wherein the color difference calculation part determines a color difference between main shooting color information of a flesh-colored area and the preset color information stored in the storage part, the main shooting color information of the flesh colored area being judged by the color judgment part with respect to a figure image obtained through main shooting in the image part.

Further, preferably, the storage part is characterized to store color information of a flesh-colored area judged by the color judgment part with respect to a figure image being shot when the photoflash part is nonluminous as the preset color information, and the color conversion part executes processing of the color conversion in a case a photoflash part is on, in which the photoflash part emits light at a time of shooting in the imaging part.

With the use of an electronic camera and a medium storing an image processing program according to the present embodiment, it is possible to obtain a natural figure image with a small difference in color between a flesh color of a face and a flesh color of a portion surrounding the face.

BRIEF DESCRIPTION OF THE DRAWINGS

FIGS. 13(a), 13(b), and 13(c) are auxiliary views showing an example of determining a contribution degree.

DETAILED DESCRIPTION OF THE EMBODIMENT

Hereinafter, an explanation will be made on embodiments regarding an electronic camera and an image processing program according to the present invention.

Figure 1:
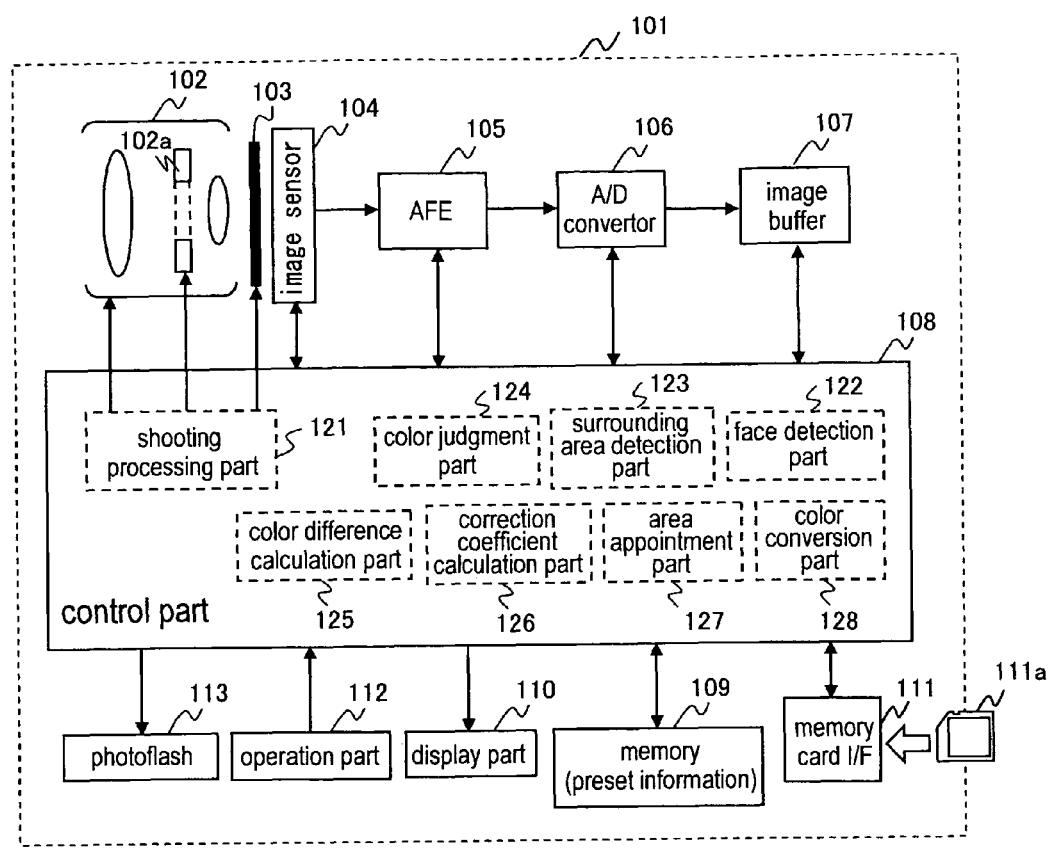
FIG. 1 is a block diagram showing a structure of an electronic camera 101 according to the present embodiment.

FIG. 1 is a block diagram showing a structure of an electronic camera 101 according to the present embodiment. Note that the electronic camera 101 in FIG. 1 includes the image processing program according to the present invention. In particular, the electronic camera 101 according to the present embodiment has "portrait mode", in which a natural figure image can be obtained by reducing a difference in color between a flesh color of a face and a flesh color of a portion surrounding the face of a shot person.

In FIG. 1, the electronic camera 101 is formed of an imaging optical system 102, a mechanical shutter 103, an image sensor 104, an AFE (analog front end) 105, an A/D convertor 106, an image buffer 107, a control part 108, a memory 109, a display part 110, a memory card I/F 111, an operation part 112, and a photoflash 113.

In FIG. 1, subject light incident on the imaging optical system 102 is incident on a light-receiving surface of the image sensor 104 via the mechanical shutter 103. Here, the imaging optical system 102 is formed of a plurality of lenses such as zoom lenses and focus lenses, and has an aperture 102a.

Photoelectric conversion parts are two-dimensionally arranged on the light-receiving surface of the image sensor 104, convert light into electrical signals in accordance with the amount of light incident on the respective photoelectric conversion parts, and output the signals to the AFE 105.

The AFE 105 performs noise reduction, amplification, and the like on the electrical signals output from the image sensor 104, and outputs the resultant signals to the A/D convertor 106.

The A/D convertor 106 converts the electrical signals output from the AFE 105 into digital signals, and temporarily stores the digital signals corresponding to one screen in the image buffer 107 as shot image data. Further, the image buffer 107 is used also as an image buffer at the time of performing image processing and a display image buffer at the time of displaying an image on the display part 110, and flesh color correction in the "portrait mode" is also performed on the image buffer 107. Note that the image buffer 107 is formed of a non-volatile high-speed memory.

The control part 108 performs image processing such as white balance processing, color correction processing, gamma conversion processing and JPEG compression processing on the image data temporarily stored in the image buffer 107. Further, image data in JPEG format after the JPEG compression is performed is stored in a memory card 111a via the memory card I/F 111. In particular, in the present embodiment, the control part 108 also performs flesh color correction processing in the "portrait mode". Note that the flesh color correction processing performed by the control part 108 will be described later in detail.

The memory 109 is formed of a non-volatile memory, and stores setting contents of a shooting mode and a reproducing mode of the electronic camera 101, or parameters such as exposure information and focus information, setting values, and the like. Particularly, in the present embodiment, parameters such as a range of a flesh-colored area which is referred to in the flesh color correction processing in the "portrait mode" are stored. Further, these parameters have default values which are stored at the time of manufacturing the electronic camera 101, but, the values can be changed by a shooting person through a setting menu of the electronic camera 101.

The display part 110 displays, in accordance with an instruction from the control part 108, the shot image temporarily stored in the image buffer 107, the shot image read out from the memory card 111a to the image buffer 107, and the like. Further, a menu screen output from the control part 108 and the like are also displayed on the display part 110.

The operation part 112 is formed of operation buttons such as a power button, a release button, and a cursor key. A user operates these operation buttons to operate the electronic camera 101. Operational information of these operation buttons is output to the control part 108, and the control part 108 controls the entire operation of the electronic camera 101 in accordance with the operational information input from the operation part 112.

The photoflash 113 emits light when an exposure is insufficient and when the user sets to perform forcible light emission, in accordance with an instruction from the control part 108.

Next, the control part 108 in FIG. 1 will be described in detail. The control part 108 operates in accordance with a program previously stored therein, and controls respective parts of the electronic camera 101. The control part 108 is formed of a shooting processing part 121, a face detection part 122, a surrounding area detection part 123, a color judgment part 124, a color difference calculation part 125, a correction coefficient calculation part 126, an area appointment part 127, and a color conversion part 128. Note that for easier explanation, the face detection part 122, the surrounding area detection part 123, the color judgment part 124, the color difference calculation part 125, the correction coefficient calculation part 126, the area appointment part 127, and the color conversion part 128 are illustrated as a structure in which they are included in the control part 108 in the present embodiment, but, they may also be formed by a dedicated hardware circuit separate from the control part 108.

The shooting processing part 121 performs focus control, exposure control, and the like on an image to be shot. For instance, in the focus control, a focal position is determined based on the image taken into the image buffer 107 to move the position of the focus lens of the imaging optical system 102. Note that these processing are performed by using the image taken into the image buffer 107 via the image sensor 104 at the time of shooting a preview image, but, there is no problem if the focus control and the exposure control are performed by using dedicated AF sensor and AE sensor. Further, when shooting the preview image, the shooting is performed by using an electronic shutter in which a shutter speed is controlled based on an exposure time of the image sensor 104 by setting the mechanical shutter 103 to be constantly in an open state. Here, the preview image is an image with which the shooting person decides a shooting composition and the like, based on moving images temporally continuously shot by the image sensor 104 and displayed on the display part 110. Further, when the shooting person presses the release button of the operation part 112, image data obtained through main shooting is temporarily stored in the image buffer 107. Note that when the exposure is insufficient and when the user sets to perform forcible light emission, the shooting processing part 121 makes the photoflash 113 emit light to control to achieve correct exposure.

Figure 2:
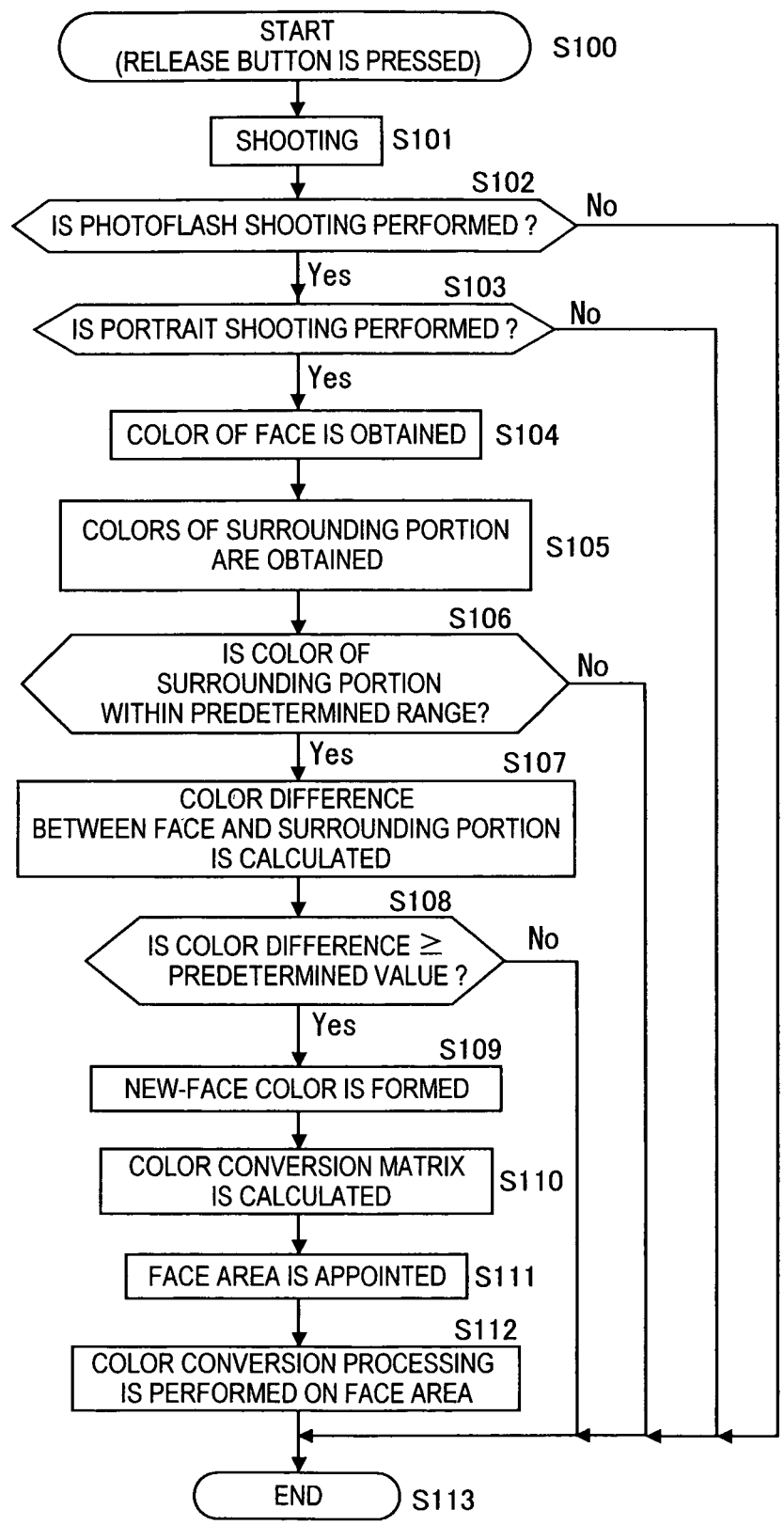
FIG. 2 is a flow chart showing processing in the electronic camera 101 according to the present embodiment.

Next, operations of the respective processing parts included in the control part 108 (the face detection part 122, the surrounding area detection part 123, the color judgment part 124, the color difference calculation part 125, the correction coefficient calculation part 126, the area appointment part 127, and the color conversion part 128) will be described in detail by using a flow chart in FIG. 2. The flow chart in FIG. 2 shows a processing procedure at the time of shooting when the mode of the electronic camera 101 is set to the "portrait mode". Hereinafter, the procedure will be described in order in accordance with the flow chart in FIG. 2.

(Step S100) The shooting person presses the release button of the operation part 112.

(Step S101) When the release button is pressed, the shooting processing part 121 of the control part 108 performs the focus control, the exposure control and the like on an image to be shot, and then temporarily stores the image shot by the image sensor 104 in the image buffer 107, as explained before. Note that the shooting processing part 121 makes the photoflash 113 emit light when the exposure is insufficient and when the forcible light emission is set to be performed.

(Step S102) The control part 108 judges whether or not photoflash shooting is performed in the shooting in step S101. When the photoflash shooting is performed, the process proceeds to step S103, and when the photoflash shooting is not performed, the process proceeds to step S113. Note that whether or not the photoflash shooting is performed can be judged based on a processing result of the shooting processing part 121.

(Step S103) The control part 108 judges, from the image shot in step S101, whether or not portrait shooting is performed. When the portrait shooting is performed, the process proceeds to step S104, and when it is not performed, the process proceeds to step S113. Note that whether or not the portrait shooting is performed is judged by the face detection part 122. Specifically, when a face is detected, it is judged that the portrait shooting is performed.

Here, the face detection part 122 detects whether or not there is a face of a person in the shot image. In the face detection, it is searched whether or not there is a portion that matches a previously set characteristic parameter of face (an outline, an arrangement of eyes, nose and mouth, and the like) in the shot image, for instance. Further, the portion that matches the characteristic parameter of face is judged as the face of the person. Note that since the face detection itself is not an essential part of the present embodiment, a detailed explanation thereof will be omitted and, as a face detection method, there are known various methods, and either of the methods may be used. Further, when the face detection processing is conducted by the face detection part 122, the surrounding area detection part 123 detects an area surrounding the face. The area surrounding the face is, for example, a neck portion (decollete portion), a shoulder portion, an ear portion or the like. Note that in a detection method for the area surrounding the face, since an arrangement of the face, neck, shoulder, and ears is almost decided, there is previously prepared a template indicating an arrangement of the face, neck, shoulder, and ears, for example, and the template is expanded or reduced to be matched to the outline of the face of the shot image, to thereby recognize approximate positions of the neck, shoulder, and ears. Alternatively, it is also possible to simply judge that a lower portion of a face area is a neck area. Note that since the neck area tends to be covered by a shadow of chin, a portion as far as possible from the face position is set to be selected.

Figure 3:
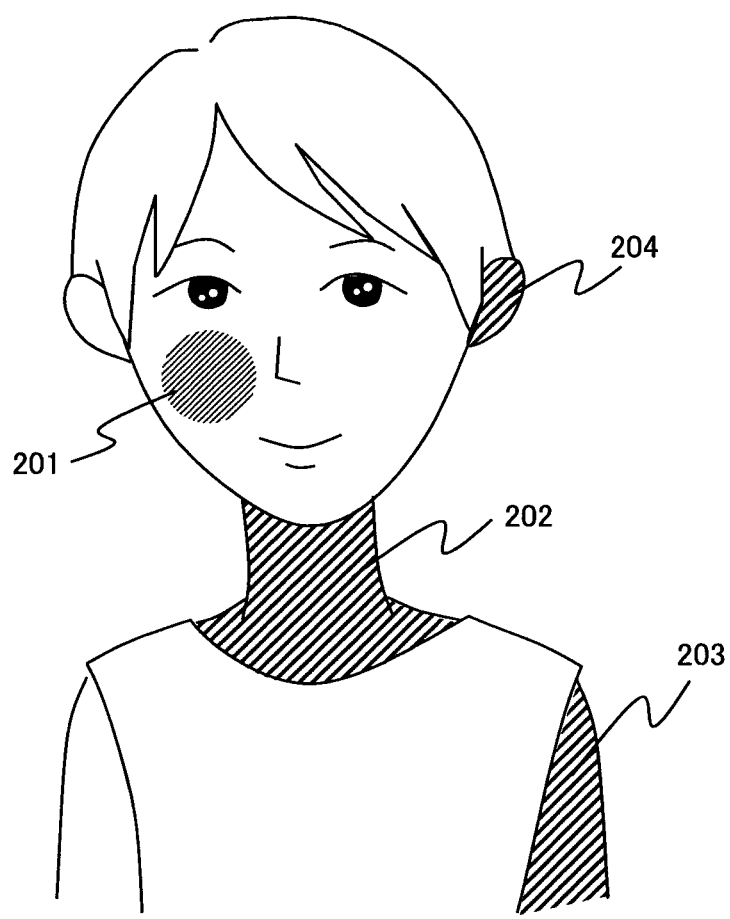
FIG. 3 is an auxiliary view showing areas of a face portion and portions surrounding the face.

(Step S104) The color judgment part 124 of the control part 108 obtains a color of the face portion (first color information) judged in step S103. For example, as shown in FIG. 3, a color of a cheek portion 201 is obtained. Note that detection of positions of cheeks can be estimated based on the outline of the face and the arrangement of eyes, nose, and mouth determined through the face detection by the face detection part 122. For instance, in an inverted triangle formed of both eyes and mouth, center portions of two sides between both eyes and mouth can be set as the positions of cheeks.

(Step S105) The color judgment part 124 of the control part 108 obtains a color of the area surrounding the face (second color information) judged in step S103. For example, as shown in FIG. 3, a color of a neck portion 202, a shoulder portion 203, an ear portion 204 or the like is obtained. Note that the positions of the neck, shoulder, and ears correspond to the positions determined when the surrounding area detection part 123 detects the area surrounding the face, for instance.

(Step S106) The color judgment part 124 of the control part 108 judges whether or not the color of the area surrounding the face obtained in step S105 is a color within a predetermined range. When the color is the color within the predetermined range, the process proceeds to step S107, and when it is not the color within the predetermined range, the process proceeds to step S113.

Figure 4:
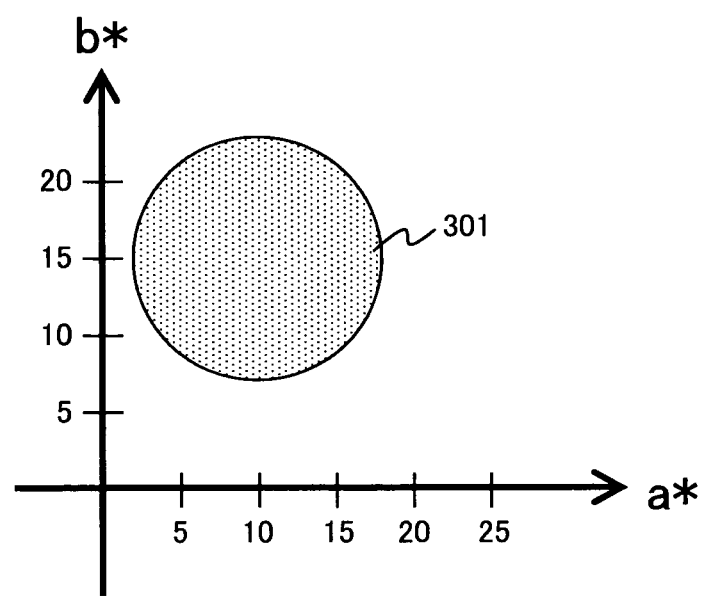
FIG. 4 is an auxiliary view showing an example of a color space and a flesh-colored area.

Here, a judgment method of colors will be described. FIG. 4 is a view showing a color space represented by an L*a*b* color system defined by CIE (INTERNATIONAL COMMISSION ON ILLUMINATION), in which the color space is also called as an equivalent color space, and in which a distance and a space on the color space closely correspond to human perceptual color distance and space. Note that a value of L* represents a brightness, a value of a* represents that of an axis of red to green, and b* represents an axis of yellow to blue. In the present embodiment, a range of the flesh-colored area is easy to be recognized, so that the color space represented by the L*a*b* color system is used, but, it is also possible to use a color space represented by an RGB color system, an XYZ color system, a YUV (YCrCb) color system or the like. If any one of the color spaces is used, it is possible to convert the color space into another color space through calculation. A portion indicated by a shadowed circle in FIG. 4 denotes a flesh-colored area 301. Note that although there are various ways of thinking regarding the area of flesh color depending on each person and an intended purpose, in an example in FIG. 4, the flesh-colored area is illustrated under conditions where a*=10±8 and b*=15±8.

In step S106, the color judgment part 124 judges whether or not the color of the area surrounding the face obtained in step S105 is within the flesh-colored area 301 in FIG. 4. Further, when the color is within the flesh-colored area 301, the process proceeds to step S107, and when it is not within the flesh-colored area 301, the process proceeds to step S113. Note that through the processing of the present step, it is possible to exclude a state where the flesh color detection cannot be conducted, such as, for example, when a person wears clothes covering his/her shoulder, when a person wears a muffler around his/her neck, or when ears of a person are covered by hair. Further, if three portions of the neck portion 202, the shoulder portion 203, and the ear portion 204 shown in FIG. 3 are previously set as the areas surrounding the face from which the color is obtained in step S105, it is also possible to set such that the process proceeds to the following step S107 when, for example, either one portion among these three portions has the color within the predetermined range. Note that in this case, only the color within the predetermined range is set as a later-described target color.

Figure 5:
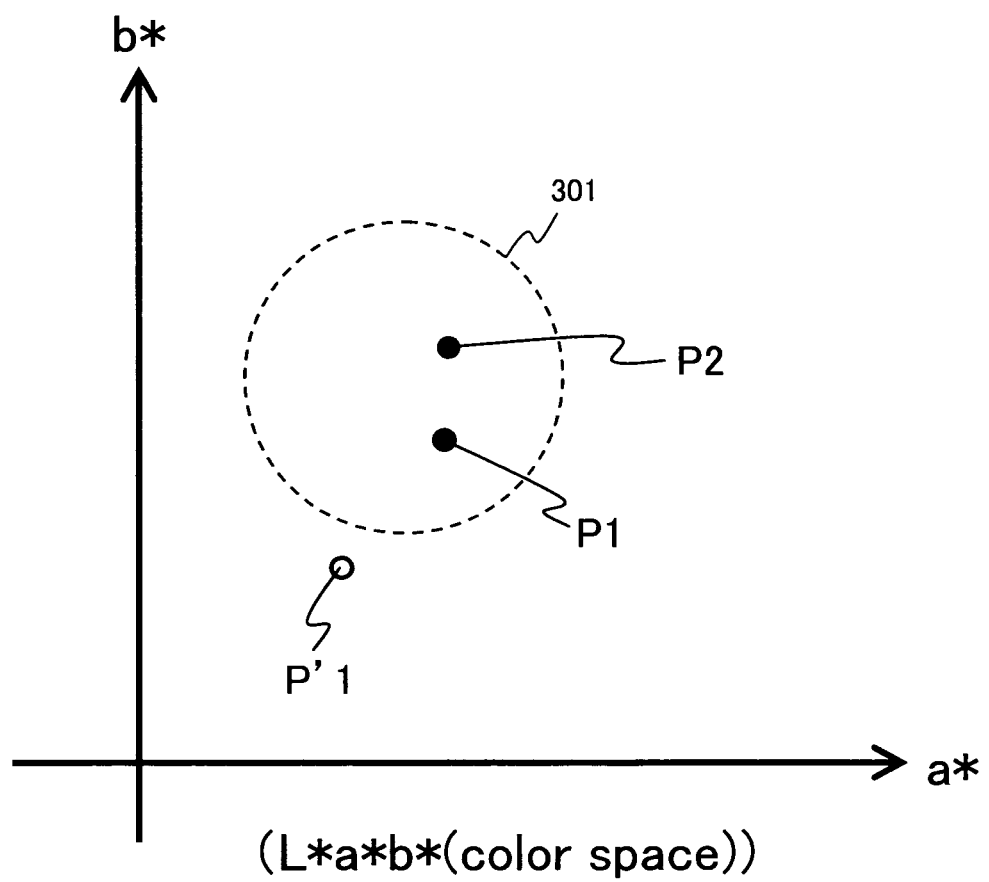
FIG. 5 is an auxiliary view for explaining an obtainment of color and a color difference.

(Step S107) The color difference calculation part 125 of the control part 108 calculates a color difference between the color of the face portion obtained in step S104 and the color of the area surrounding the face obtained in step S105. FIG. 5 is a view showing the flesh-colored area 301 on the color space represented by the L*a*b* color system explained in FIG. 4, in which a point P1 indicates color coordinates of the face portion obtained in step S104, and a point P2 indicates color coordinates of the area surrounding the face obtained in step S105. In step S107, the color difference calculation part 125 calculates a color difference between the point P1 and the point P2. Note that the color difference can be determined as, for example, a distance between the color coordinates of the point P1 and the color coordinates of the point P2.

Note that in FIG. 4 and FIG. 5, only the coordinates of a* and b* in the color space represented by the L*a*b* color system are shown for easier understanding, but, actually, it is also possible to provide a range of value of L* being the brightness as the flesh-colored area. For example, as the flesh-colored area, it is set such that the range of the value of L* is 30 to 80, the range of the value of a* is 2 to 18, and the range of the value of b* is 7 to 23, and the set values are previously stored in the memory 109. Alternatively, it is also possible to provide a flesh-colored area setting menu in the electronic camera 101, with which the user can freely perform settings and changes.

(Step S108) The control part 108 judges whether or not the color difference between the color of the face portion and the color of the area surrounding the face calculated by the color difference calculation part 125 in step S107 is equal to or greater than a predetermined value. When the color difference is equal to or greater than the predetermined value, the process proceeds to step S109, and when it is less than the predetermined value, the process proceeds to step S113. For instance, in FIG. 5, it is judged whether or not the color difference between the point P1 and the point P2 is equal to or greater than the predetermined value. Further, when the color difference between the color of the face portion and the color of the area surrounding the face is less than the predetermined value, since it can be seen that the color of the face portion and the color of the area surrounding the face are already resembling flesh colors, the process proceeds to step S113 without performing the flesh color correction processing, and the processing is terminated.

However, when shooting is performed with light emission of the photoflash 113 on a person being a subject who puts on makeup on her/his face using foundation and the like, the color of the face portion obtained in step S104 becomes out of the flesh-colored area 301 in FIG. 5, and takes color coordinates, of a point P'1 in FIG. 5, for instance. In this case, a color difference between the point P'1 and the point P2 is determined in step S107, and since the color difference (distance between color coordinates) between the point P'1 and the point P2 is greater than the color difference (distance between color coordinates) between the point P1 and the point P2, the predetermined value for judging the color difference is set to a value with which the two color differences can be distinguished, for instance. Accordingly, it can be seen that when the color difference between the color of the face portion and the color of the area surrounding the face is equal to or greater than the predetermined value, the color of the face portion and the color of the area surrounding the face are largely different flesh colors, so that the process proceeds to the following step S109 to execute the flesh color correction processing. Note that the predetermined value for the color difference judgment is previously stored in the memory 109. Further, it is also possible to provide a menu for setting the predetermined value for the color difference judgment in the electronic camera 101, with which the user can freely perform settings and changes.

(Step S109) The control part 108 forms a target face color (new-face color). Note that it is also possible to automatically set the color of the area surrounding the face obtained in step S105 as a default value of the new-face color, without any operation by the user. Alternatively, when over-correction is performed or when the reliability for selecting and obtaining the color of the area surrounding the face such as the neck and shoulder is low, a neutral color between the face color and the color of the area surrounding the face may also be set as the new-face color. Further, it is also possible to provide a setting menu for setting the new-face color in the electronic camera 101, with which the user can freely perform settings and changes.

(Step S110) The correction coefficient calculation part 126 of the control part 108 calculates a color conversion matrix for converting the color of the face portion into the new-face color.

Here, the color conversion matrix will be described. The color conversion matrix is formed of coefficients for converting a specific hue on the color space into a target hue, and hue coordinates in the L*a*b* color system shown in FIG. 4 are formed of four coefficients of the color conversion matrix of two rows by two columns. The color conversion matrix of two rows by two columns can be calculated by selecting two points in the current face color and two points in the new-face color (target color), and by solving two color conversion determinants.

For example, in the color coordinates (a*, b*) in the color space represented by the L*a*b* color system explained in FIG. 4, if the target color of a first point is first set to have color coordinates (a1, b1), and the current face color corresponding thereto is set to have color coordinates (a'1, b'1), a determinant of (equation 1) is satisfied. Next, if the target color of a second point is set to have color coordinates (a2, b2), and the current face color corresponding thereto is set to have color coordinates (a'2, b'2), a determinant of (equation 2) is satisfied. Note that in the determinants of the (equation 1) and the (equation 2), g11, g12, g21, and g22 are four coefficients that form the color conversion matrix.

$$\begin{pmatrix} a1 \\ b1 \end{pmatrix} = \begin{pmatrix} g11 & g12 \\ g21 & g22 \end{pmatrix} \begin{pmatrix} a'1 \\ b'1 \end{pmatrix} \quad \text{(equation 1)}$$

$$\begin{pmatrix} a2 \\ b2 \end{pmatrix} = \begin{pmatrix} g11 & g12 \\ g21 & g22 \end{pmatrix} \begin{pmatrix} a'2 \\ b'2 \end{pmatrix} \quad \text{(equation 2)}$$

Here, the color coordinates (a1, b1) and the color coordinates (a2, b2) of the target color are set by the user or automatically decided in step S109, so that they are already known values. Further, the color coordinates (a'1, b'1) and the color coordinates (a'2, b'2) of the current face color are also already known values since the values obtained in step S104 are used. Therefore, four unknowns of g11, g12, g21, and g22 that form the color conversion matrix can be determined by solving four equations obtained from the two determinants of the (equation 1) and the (equation 2).

Note that although the (equation 1) and the (equation 2) are equations representing the color conversion matrix when the L*a*b* color system is used, equations representing a color conversion matrix when, for example, the YUV color system often used in an electronic camera is used, become as represented by (equation 3) and (equation 4). In the determinant of the (equation 3), a target color of a first point has color coordinates (U1, V1), a current face color corresponding thereto has color coordinates (U'1, V'1), and a color conversion matrix at this time is formed of four coefficients of h11, h12, h21, and h22. In like manner, in the determinant of the (equation 4) representing the color conversion of a second point, a target color of the second point has color coordinates (U2, V2), a current face color corresponding thereto has color coordinates (U'2, V'2), and a color conversion matrix at this time is formed of four coefficients of h11, h12, h21, and h22.

$$\begin{pmatrix} U1 \\ V1 \end{pmatrix} = \begin{pmatrix} h11 & h12 \\ h21 & h22 \end{pmatrix} \begin{pmatrix} U'1 \\ V'1 \end{pmatrix} \quad \text{(equation 3)}$$

$$\begin{pmatrix} U2 \\ V2 \end{pmatrix} = \begin{pmatrix} h11 & h12 \\ h21 & h22 \end{pmatrix} \begin{pmatrix} U'2 \\ V'2 \end{pmatrix} \quad \text{(equation 4)}$$

Here, the color coordinates (U1, V1) and the color coordinates (U2, V2) of the target color are set by the user or automatically decided in step S109, so that they are already known values. Further, the color coordinates (U'1, V'1) and the color coordinates (U2', V2') of the current face color are also already known values since the values obtained in step S104 are used. Therefore, four unknowns of h11, h12, h21, and h22 that form the color conversion matrix can be determined by solving four equations obtained from the two determinants of the (equation 3) and the (equation 4). As above, when not only the L*a*b* color system but also another color system such as the YUV color system is used, the color conversion matrix can be determined in the same manner.

(Step S111) The area appointment part 127 of the control part 108 appoints a face area on which the color conversion is performed. For the appointment of the face area, the face portion 401 is selected as shown in FIG. 6 and, for instance, it is possible to utilize the outline detection of face previously performed by the face detection part 122 when it detects the face of the person.

Figure 6:
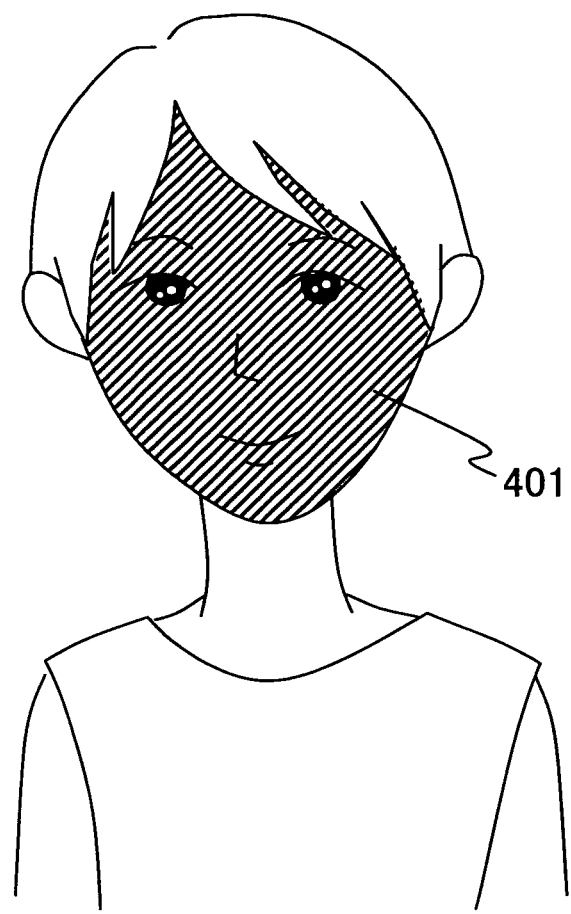
FIG. 6 is an auxiliary view for explaining an appointment of area.

Note that for the outline of the face, it does not always have to detect the face portion 401 as it is, as shown in FIG. 6, and it is also possible to select a portion little wider than the face portion 401. This is because since the current color is not forcibly replaced with a specific target color but is shifted by the color difference between the color coordinates close to the flesh-colored area using the color conversion matrix, the color of the portion out of the face portion 401 is not replaced with an extremely different color.

(Step S112) The color conversion part 128 of the control part 108 performs color conversion on the inside of the face area appointed in step S111 using the color conversion matrix determined in step S110. Note that the color conversion is performed only on each pixel in the face area.

(Step S113) The control part 108 completes the series of shooting through the "portrait mode".

As above, the electronic camera 101 according to the present embodiment can obtain, when the mode is set to the "portrait mode", a natural figure image by reducing a difference in color between a flesh color of a face and a flesh color of a decollete portion such as the neck and shoulder. In particular, even when photoflash shooting is performed on a person who puts on makeup using foundation and the like with the electronic camera 101 and a face color of the shot figure image becomes white, since a flesh color of a face portion is corrected in accordance with a flesh color of a portion surrounding the face such as the neck and shoulder, it is possible to obscure a difference between the flesh color of the portion surrounding the face such as the neck and shoulder and the flesh color of the face.

Note that in the flow chart in FIG. 2, the color correction of the face portion is designed to be performed when the photoflash shooting is performed, but, it is also possible to similarly execute the processing to correct the flesh color of the face portion also at the time of normal shooting in which the photoflash shooting is not performed. In this case, the control part 108 executes a flow chart corresponding to the flow chart in FIG. 2 from which the processing for judging the presence/absence of the photoflash shooting in step S102 is eliminated.

Further, in the above embodiment, the flesh color of the face portion is corrected in accordance with the flesh color of the portion surrounding the face such as the neck and shoulder (target color) but, conversely, it is also possible to correct the flesh color of the portion surrounding the face such as the neck and shoulder in accordance with the flesh color of the face portion (target color). For example, it is also possible to add, to the flow chart in FIG. 2, correction area judgment processing in which the color of area being either of the color of the face obtained in step S104 and the color surrounding the face obtained in step S105 and close to a more ideal flesh color (flesh color predetermined set by the user, for instance) is set as the target color, and the area whose color is more different from the ideal flesh color is set as a correction target area. In this case, in the flow chart in FIG. 2, the aforementioned correction area judgment processing is conducted in step S109, and the flesh color closer to the ideal flesh color is set as the target color. Further, in the appointment processing for the face area in step S111, the face area or the area other than the face such as the neck and the shoulder is selected as the correction target area, and further, in the color conversion processing for the face area in step S112, the color conversion processing is performed on the correction target area appointed in step S111.

As above, the electronic camera 101 according to the present embodiment can reduce the difference in color between the flesh color of the face and the flesh color of the portion surrounding the face, so that a natural figure image can be obtained.

Note that in the above embodiment, the flesh color correction is designed to be performed at the time of shooting the figure image with the electronic camera 101, but, it is also possible to design such that the flesh color correction is performed at the time of shooting the preview image.

Alternatively, it is also possible to design such that the flesh color correction is performed at the time of reproducing the shot image in the electronic camera 101. For instance, when a plurality of still images stored in the memory card 111a are reproduced to be displayed on the display part 110, the image data is once read out from the memory card 111a to the image buffer 107, and it is judged whether or not the read out image data is a figure image. Further, if the image data is the figure image, the flesh color correction is executed to reduce the difference in color between the flesh color of the face portion and the flesh color of the portion surrounding the face, as described above. Such flesh color correction processing at the time of reproduction can be realized when the control part 108 performs the processing of step S103 and subsequent steps in the flow chart in FIG. 2 on the image data read out from the memory card 111a to the image buffer 107.

Further, there is no need to perform the flesh color correction at the time of shooting or reproducing the image, and it is also possible to provide "flesh color correction mode" in the electronic camera 101, in which images on which the flesh color correction is performed are selected among the shot images which are thumbnail displayed, and the flesh color correction is collectively performed on the selected shot images. The processing at this time can also be realized by reading out the selected shot images, one by one or collectively, from the memory card 111a to the image buffer 107, and by executing the processing of step S103 and subsequent steps in the flow chart in FIG. 2.

As above, by executing the flesh color correction at the time of reproducing the image or after the image is shot, not at the time of shooting the image, even when there is performed continuous shooting and the like in which the processing for correcting the flesh color cannot be simultaneously performed, it is possible to conduct the correction to reduce the difference in color between the flesh color of the face portion and the flesh color of the portion surrounding the face, which enables to obtain a natural figure image.

Further, although the flesh color correction is designed to be performed in the electronic camera 101 in the above embodiment, it is also possible to perform the flesh color correction by coupling the memory card 111a in which the shot images are stored to a computer and executing an image processing program on the computer, similar to the case where the flesh color correction is performed at the time of reproducing the image or after the shooting of the image. In this case, the computer corresponds to the control part 108 in FIG. 1, and the image processing program executed on the computer corresponds to the program with which the respective parts of the control part 108 execute the processing of step S103 and subsequent steps in the flow chart in FIG. 2.

As above, with the use of the electronic camera 101 and the image processing program according to the present invention, it is possible to obtain a natural figure image with a small difference in color between the flesh color of the face and the flesh color of the portion surrounding the face. Note that it is supposed that the aforementioned image processing program is distributed in a state of being stored in a medium readable by a computer, and is installed in the computer to be executed.

APPLICATION EXAMPLE 1

Next, an application example 1 of the electronic camera 101 and the image processing program explained in the aforementioned embodiment will be described. Note that also in the application example 1, the structure of the electronic camera 101 explained in FIG. 1 is the same, and a part of the processing is different. In the application example 1, when the color judgment part 124 of the control part 108 obtains the color of the area surrounding the face (second color information), it obtains a plurality of colors, and a high-frequency color thereof is obtained as a representative color of the area surrounding the face.

[Obtainment of Color of Area Surrounding Face (Second Color Information)]

Figure 7:
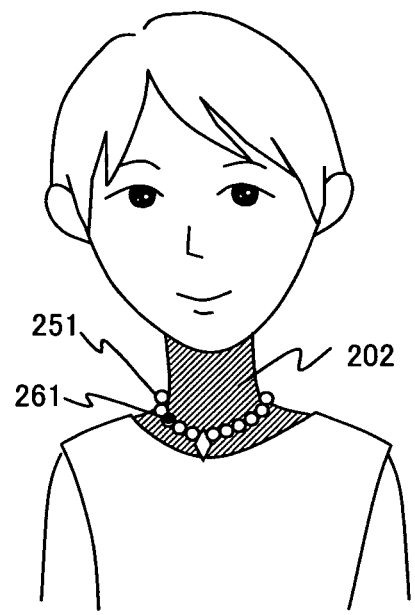
FIGS. 7(a) and 7(b) are auxiliary views for explaining processing in an application example 1.
Figure 7:
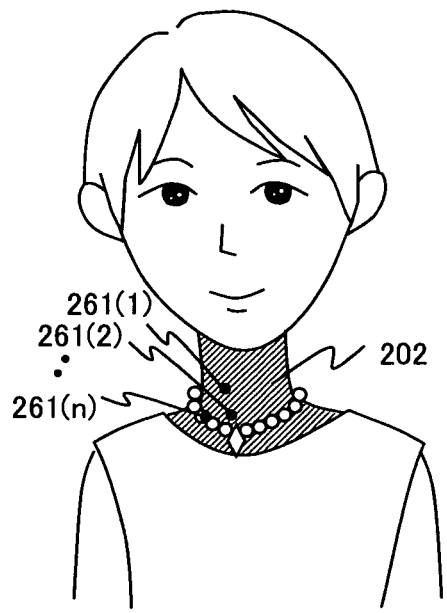

Here, in step S105 in the flow chart in FIG. 2, the color judgment part 124 of the control part 108 obtains the color of the area surrounding the face (second color information) judged in step S103. However, for instance, if an area of the neck or decollete is used as the area surrounding the face, a shot person may wear a necklace 251, as shown in FIG. 7(*a*). Accordingly, when a portion 261 from which the second color information happen to be obtained is a portion of the necklace 251, a color different from an actual flesh color is obtained. Note that although there is no problem if the color is extremely different since it is judged to be out of the predetermined range in step S106 in FIG. 2, if the person wears the necklace 251 of, for instance, gold, pearl, or the like whose color is close to the flesh color, it may be judged to be YES in step S106.

Accordingly, in the present application example 1, when the color judgment part 124 of the control part 108 obtains the color of the area surrounding the face (second color information), it obtains a plurality of colors in the area (261(1), 261(2), . . . , 261(*n*)), and uses a high-frequency color as a representative color of the area surrounding the face, as shown in FIG. 7(*b*). This is because since a proportion of the necklace portion relative to the neck or decollete portion is small, a large number of the obtained plurality of colors can be regarded as colors of portions other than the necklace. For instance, in FIG. 7(*b*), if the colors of the portions 261(1), 261(2) from which the colors are obtained are substantially the same, the colors are of high-frequency compared with the color of the necklace portion 261(*n*), resulting in that the colors of the portions 261(1), 261(2) are obtained as the color of the area surrounding the face (second color information). Note that in actual, colors of not three portions but a larger number of portions are obtained, and a high-frequency color is obtained through methods as shown in FIG. 8(*a*), FIG. 8(*b*), and FIG. 8(*c*).

Figure 8:
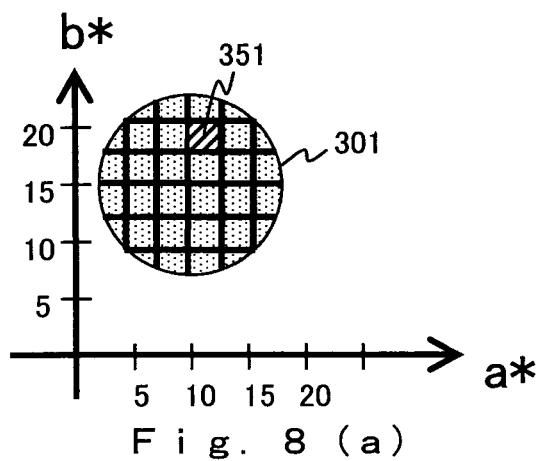
FIGS. 8(a), 8(b), and 8(c) are auxiliary views showing an example of how to determine a high-frequency color.
Figure 8:
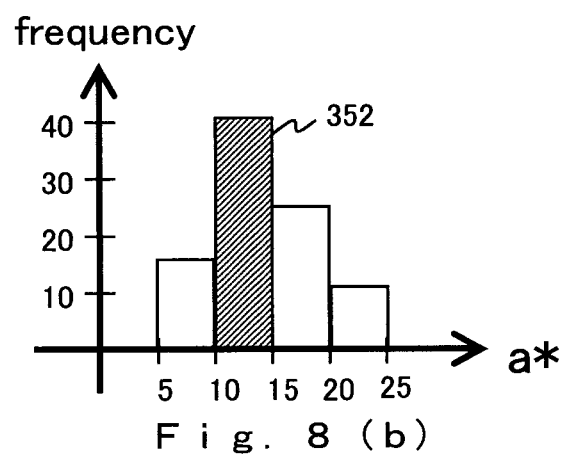
Figure 8:
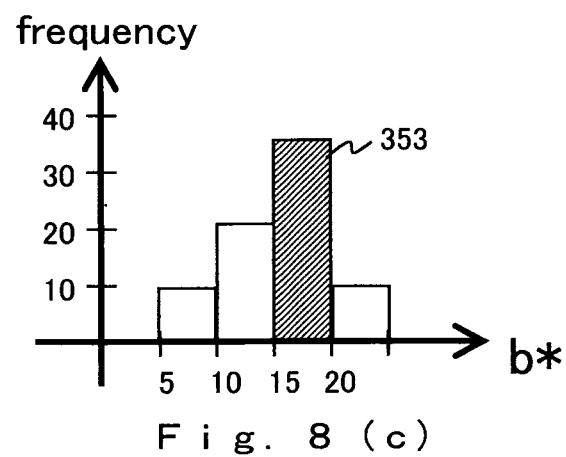

In FIG. 8(*a*), the flesh-colored area 301 at the color coordinates (a*, b*) in the color space represented by the L*a*b* color system explained in FIG. 4 is previously divided into a plurality of color areas, and each of the plurality of colors obtained from the area surrounding the face is judged to belong to which color area of the flesh-colored area 301. Further, the number of colors judged for each color area is counted, and the color of the color area with the largest number of colors is selected as a representative color of the area surrounding the face. Note that the respective color areas are divided with a certain range, so that the color of the center of the range is set as a representative color, for instance. For example, if a color area 351 in FIG. 8(*a*) is a high-frequency color area, since the range of the a* axis of the color area 351 is about 9 to about 13, a* being the representative color takes 11 being the center of the range, and since the range of the b* axis of the color area 351 is about 17 to about 21, b* being the representative color takes 19 being the center of the range. As above, the representative color (color coordinates (a*, b*)= (11, 19)) of the area surrounding the face can be obtained.

Here, since the method of counting the number of colors by dividing the flesh-colored area into a plurality of color areas as shown in FIG. 8(*a*) requires a large processing amount, as a simple method, it is also possible to determine a high-frequency color by using histograms as shown in FIG. 8(*b*) and FIG. 8(*c*). The method is a method of forming histograms in which frequency is counted for each of the a* axis and the b* axis, and combining values of high-frequency in the respective axes to set a representative color. For instance, in FIG. 8(*b*), a histogram 352 representing a value ranging from 10 to 15 is of high-frequency in the a* axis, so that 12.5 being the center of the range is set as a representative value of a*. In like manner, in FIG. 8(*c*), a histogram 353 representing a value ranging from 15 to 20 is of high-frequency in the b* axis, so that 17.5 being the center of the range is set as a representative value of b*. As above, the color coordinates (a*, b*)=(12.5, 17.5) of the representative color of the area surrounding the face can be obtained. Note that the aforementioned methods are only examples, and any method can be applied as long as it can determine the frequency.

Next, the processing of the application example 1 in which the plurality of colors of the area surrounding the face are obtained and the high-frequency color is used as the representative color of the area surrounding the face, will be explained using a flow chart in FIG. 9. Note that FIG. 9 is a view corresponding to the flow chart in FIG. 2 explained before, and the same processing are performed in steps denoted by the same reference numerals as those in FIG. 2, so that an overlapping explanation is omitted, and processing different from those of FIG. 2 will be described.

Figure 9:
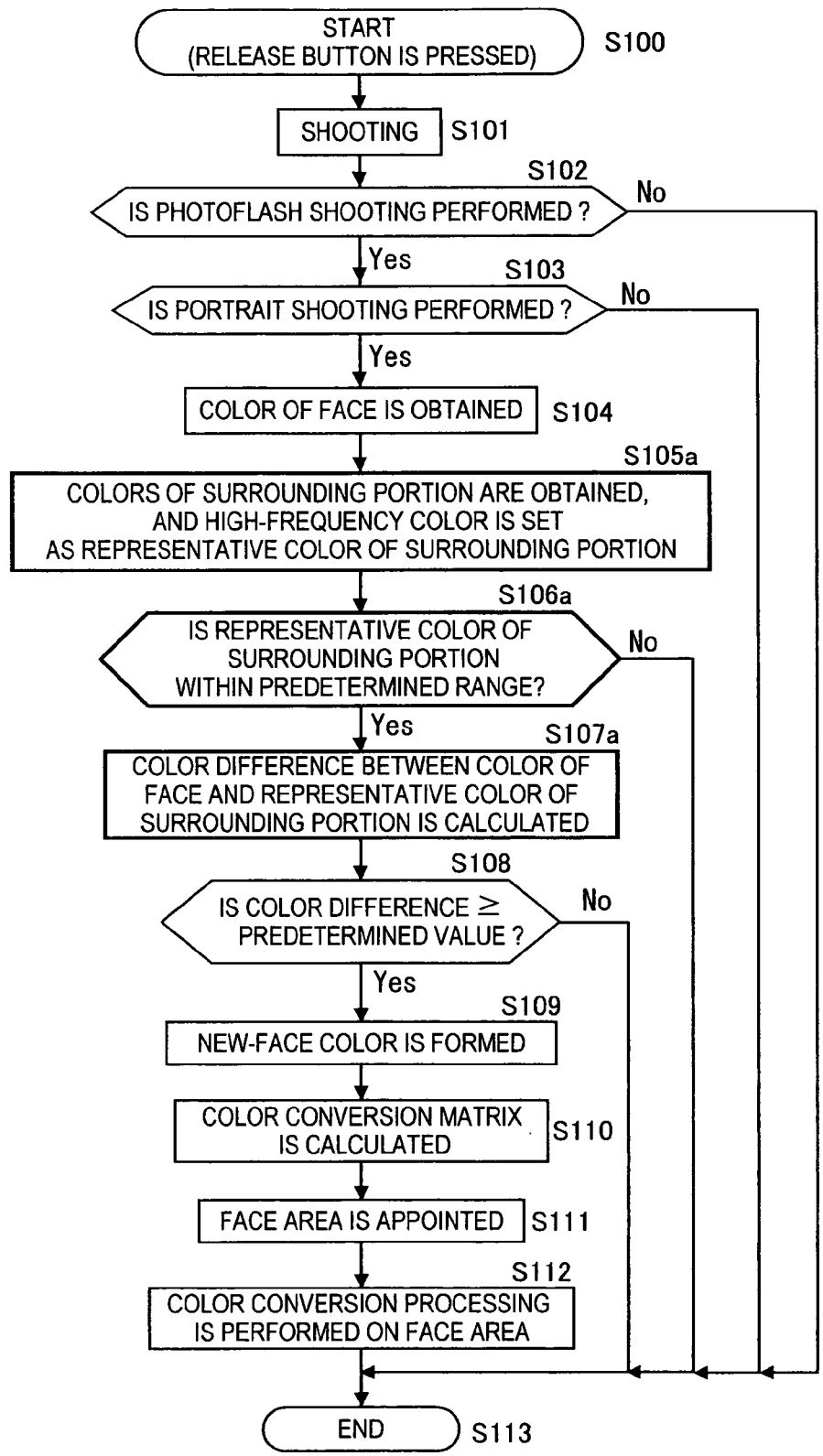
FIG. 9 is a flow chart showing processing in an electronic camera 101 according to the application example 1.

The flow chart in FIG. 9 differs from that in FIG. 2 in that processing of step S105*a*, step S106*a*, and step S107*a* are executed instead of those of step S105, step S106, and step S107 in FIG. 2. Hereinafter, these processing will be described in order.

(Step S105*a*) The color judgment part 124 of the control part 108 obtains the color of the area surrounding the face (second color information) judged in step S103. At this time, the color judgment part 124 obtains a plurality of colors from different positions in the area surrounding the face judged in step S103, and sets the high-frequency color as the representative color of the area surrounding the face, as previously described in FIG. 7 and FIG. 8. In this case, the representative color corresponds to the second color information.

(Step S106*a*) The color judgment part 124 of the control part 108 judges whether or not the representative color of the area surrounding the face determined in step S105*a* is a color within the predetermined range. When the color is the color within the predetermined range, the process proceeds to step S107*a*, and when it is not the color within the predetermined range, the process proceeds to step S113. Note that the judgment method is the same as that in step S106 in FIG. 2.

(Step S107*a*) The color difference calculation part 125 of the control part 108 calculates a color difference between the color of the face portion obtained in step S104 and the representative color of the area surrounding the face obtained in step S105*a*. Note that the calculation method is the same as that in step S107 in FIG. 2.

Further, the processing of step S108 and subsequent steps after the color difference between the representative color of the area surrounding the face and the color of the face portion is determined are the same as those of FIG. 2, so that an explanation thereof will be omitted.

Note that it is also possible to apply not only the electronic camera 101 but also a program for a computer executing the same processing as that of FIG. 9, similar to the previous embodiment. In this case, the memory card 111a in which the shot images are stored is coupled to the computer and, instead of executing the processing of steps S101, S102 in FIG. 9, the shot images are read out from the memory card 111a. Thereafter, the processing of step S103 and subsequent steps in FIG. 9 are executed in the computer. Note that it is supposed that an image processing program that performs the processing of step S103 and subsequent steps in FIG. 9 on the images read out from the memory card 111a is previously installed in the computer from a medium that stores the program.

As above, with the use of the electronic camera 101 and the image processing program according to the present application example 1, the flesh color of the face can be approximated to the flesh color obtained through the previous preset shooting, which enables to obtain a figure image with a preferred face color.

APPLICATION EXAMPLE 2

Next, an application example 2 of the electronic camera 101 and the image processing program described before will be explained. Note that also in the application example 2, the structure of the electronic camera 101 explained in FIG. 1 is the same, and a part of the processing is different. In the application example 2, there is used an electronic camera 101 that stores, in the memory 109, a color of the face, a flesh color sample or the like obtained through previous shooting (referred to as preset shooting) as a preset color, and performs correction to approximate a color of the face at the time of main shooting to the flesh color of the preset color. Note that the color of the face obtained through the preset shooting is not necessarily to be the color of the same person as the person on whom the main shooting is performed, and it is also possible to perform the preset shooting on a picture of a favorite model from fashion magazines and the like. Alternatively, it is also possible to perform the preset shooting on a standard flesh color sample of cosmetics and the like.

Figure 10:
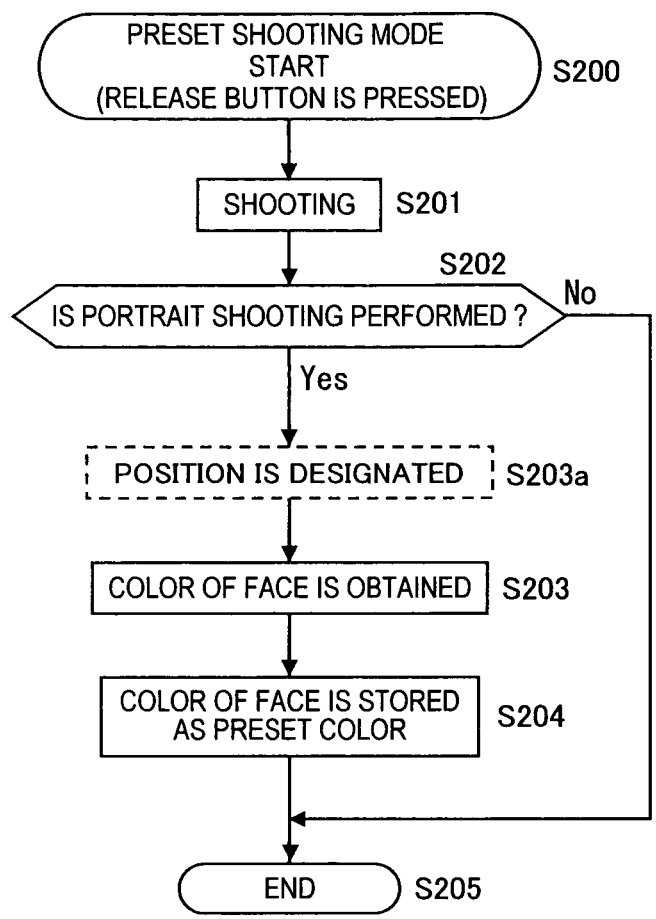
FIG. 10 is a flow chart showing processing for setting a preset color.

FIG. 10 is a flow chart illustrating processing for storing, in the memory 109, a flesh color of a face of a person on whom the preset shooting is performed as a preset color.

Note that FIG. 10 illustrates processing executed by the control part 108 in FIG. 1. Further, it is supposed that in the electronic camera 101 according to the application example 2, "preset shooting mode" for obtaining the preset color is provided, and a user previously selects the "preset shooting mode" with a shooting mode dial of the operation part 112.

(Step S200) The shooting person presses the release button of the operation part 112.

(Step S201) When the release button is pressed, the shooting processing part 121 of the control part 108 performs the focus control, the exposure control, and the like on an image to be shot, and then temporarily stores the image shot by the image sensor 104 in the image buffer 107.

(Step S202) The control part 108 judges, from the image shot in step S201, whether or not portrait shooting is performed. When the portrait shooting is performed, the process proceeds to step S203, and when it is not performed, the process proceeds to step S205. Note that whether or not the portrait shooting is performed is judged by the face detection part 122. The processing is the same as that of step S103 in FIG. 2.

(Step S203) The color judgment part 124 of the control part 108 obtains a color of the face portion judged in step S202. The processing is the same as that of step S104 in FIG. 2.

(Step S204) The control part 108 stores, in the memory 109, the color of the face portion judged in step S203 as a preset color.

(Step S205) The control part 108 completes a series of preset shooting.

As above, the person's own favorite color of the face (color of the face just after makeup is done, and the like) can be obtained as the preset color. Note that it is also possible to design such that step S203a is executed before step S203 to display the shot image on the screen of the display part 110 so that the user can designate a position from which the color is obtained by using a cursor button and the like of the operation part 112. Further, in the flow chart in FIG. 10, the color of the face of the person is stored in the memory 109 as the preset color but, for instance, it is also possible to store, in the memory 109, a color obtained from an image of the flesh color sample shot on the entire screen (a color at a predetermined position of the image, an average value of colors at a plurality of positions of the image, or the like) as the preset color, without executing steps S202, S203.

[Flesh Color Correction Processing in "Portrait Mode" Using Preset Color]

Figure 11:
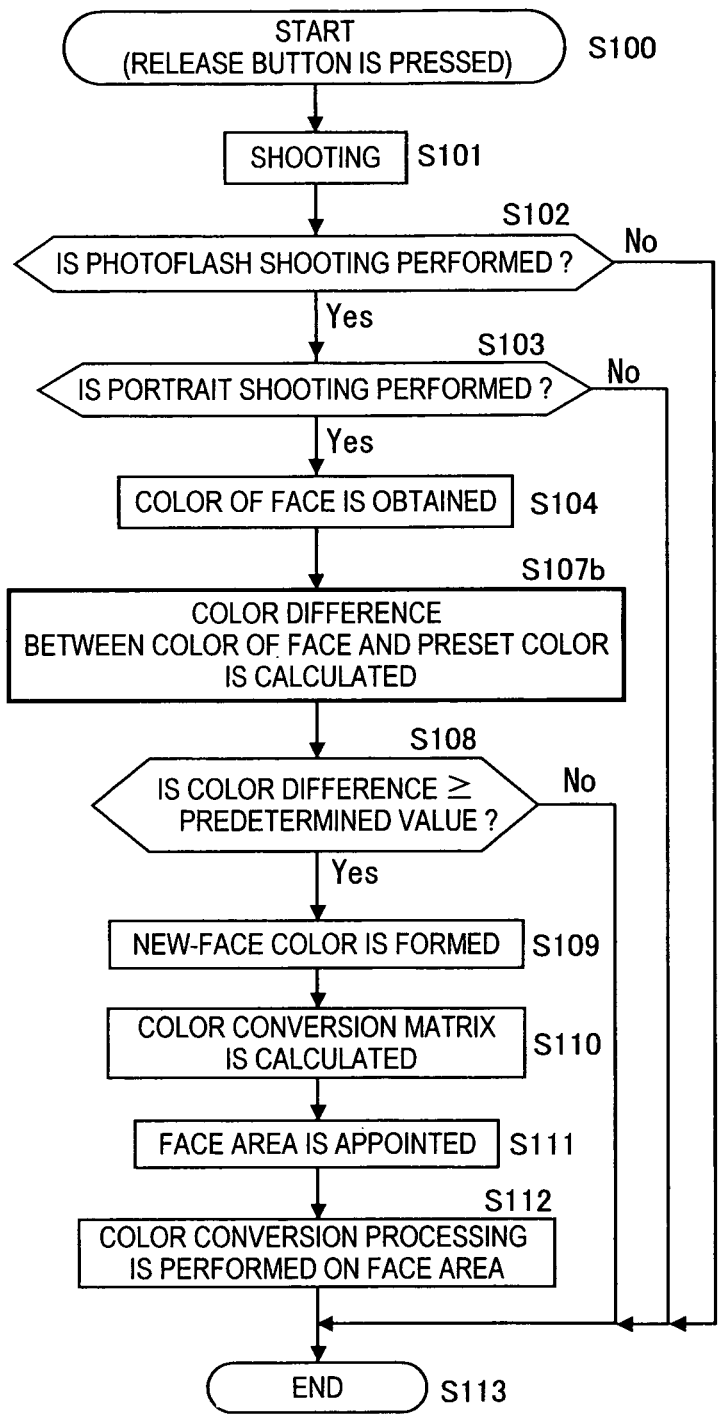
FIG. 11 is a flow chart showing processing in an electronic camera 101 according to an application example 2.

Next, flesh color correction processing in the "portrait mode" in the electronic camera 101 in the application example 2 will be described using a flow chart in FIG. 11. The flow chart in FIG. 11 corresponds to the flesh color correction processing in the "portrait mode" explained in FIG. 2, but, it differs in that the flesh color is approximated to the preset color, not to the color of the area surrounding the face. Note that in FIG. 11, steps having the same numbers as the step numbers in FIG. 2 indicate the same processing as those of FIG. 2. Accordingly, the processing from steps S100 to S104 in FIG. 11 are the same processing as those in FIG. 2. Further, after conducting step S104, the following step S107b is carried out.

(Step S107b) The color difference calculation part 125 of the control part 108 calculates a color difference between the color of the face portion obtained in step S104 and the preset color obtained through the "preset shooting" explained in FIG. 10. Note that the calculation method in this processing is the same as that in step S107 in FIG. 2 except that the color of the area surrounding the face is replaced with the preset color stored in the memory 109.

Further, the processing after the color difference between the preset color and the color of the face portion is determined (the processing of step S108 and subsequent steps) are the same as those of FIG. 2, so that an explanation thereof will be omitted.

Note that it is also possible to apply not only the electronic camera 101 but also a program for a computer executing the processing in FIG. 11, similar to the previous embodiments. In this case, the memory card 111a in which the shot images are stored is coupled to the computer and, instead of executing the processing of steps S101, S102 in FIG. 11, processing to read out the shot images from the memory card 111a is executed. Thereafter, the processing of step S103 and subsequent steps in FIG. 11 are executed in the computer. Note that it is supposed that an image processing program that performs the processing of step S103 and subsequent steps in FIG. 11 on the images read out from the memory card 111a is previously installed in the computer from a medium that stores the program.

As above, with the use of the electronic camera 101 and the image processing program according to the present application example 2, the flesh color of the face can be approximated to the flesh color obtained through the previous preset shooting, which enables to obtain a figure image with a preferred face color.

APPLICATION EXAMPLE 3

Next, an application example 3 of the electronic camera 101 and the image processing program described before will be explained. Note that also in the application example 3, the structure of the electronic camera 101 explained in FIG. 1 is the same, and a part of the processing is different. In the application example 3, when the correction coefficient calculation part 126 of the control part 108 calculates the color conversion matrix for converting the color of the face portion into the new-face color, it performs weighting processing on the coefficients of the color conversion matrix. As explained in FIG. 4, the color conversion matrix is formed of coefficients for converting a specific color on the color space into a target color, and the coefficients correspond to, for example, g11, g12, g21, and g22 in the determinants of the (equation 1) and the (equation 2).

Further, if weighting coefficients are set to a11, a12, a21, and a22, and coefficients of the color conversion matrix on which the weighting is performed are set to g11', g12', g21', and g22', the calculation can be made as the following (equation 5) to (equation 8).

$$g11'=a11 \times g11 \qquad \text{(equation 5)}$$

$$g12'=a12 \times g12 \qquad \text{(equation 6)}$$

$$g21'=a21 \times g21 \qquad \text{(equation 7)}$$

$$g22'=a22 \times g22 \qquad \text{(equation 8)}$$

Figure 12:
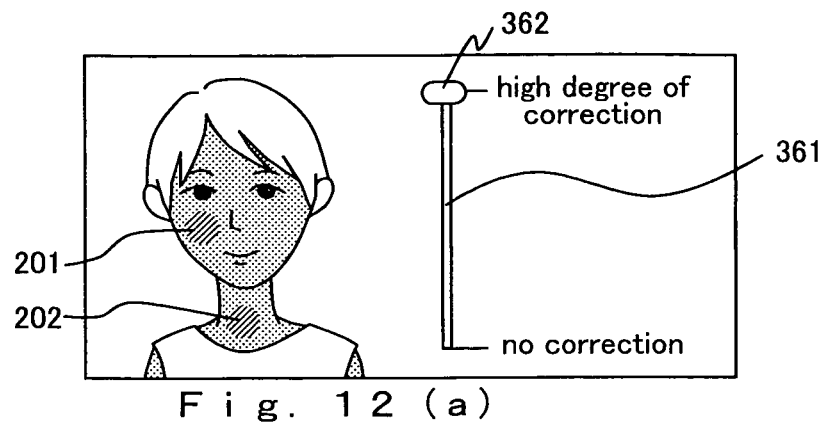
FIGS. 12(a), 12(b), and 12(c) are auxiliary views showing an example of "correction degree selection menu" executed through weighting processing in an application example 3.
Figure 12:
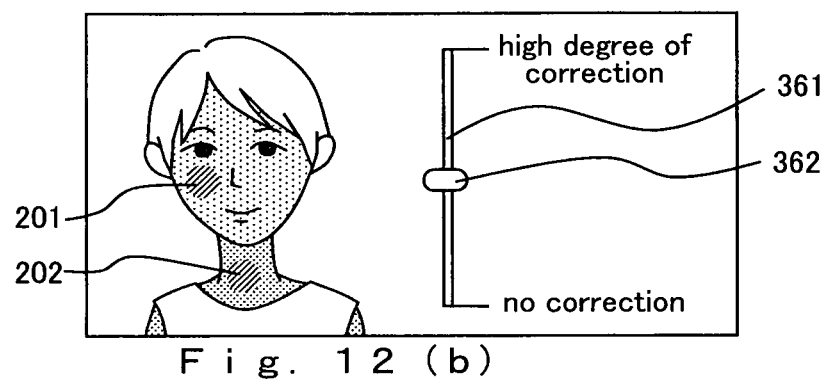
Figure 12:
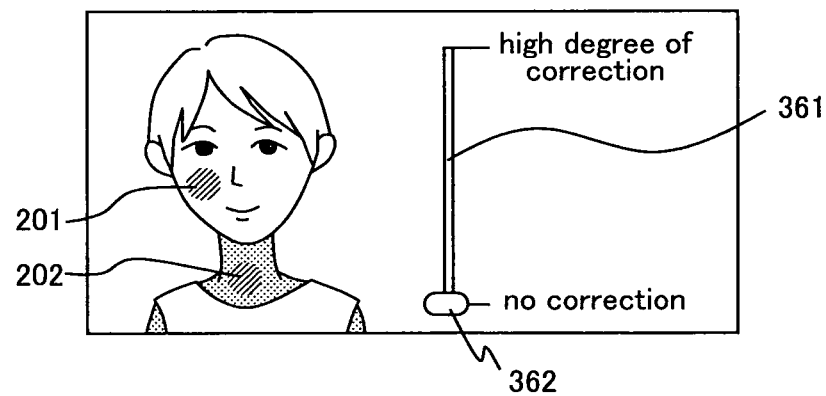

As above, the color conversion part 128 can adjust the degree of color conversion by performing color conversion processing using the color conversion matrix on which the weighting is performed determined by the correction coefficient calculation part 126. Note that the setting of the weighting coefficients is performed by, for instance, providing "correction degree selection menu" and selecting a preferred degree of correction while watching the shot image. For example, as shown in FIG. 12(a), a slide bar 361 that adjusts the degree of correction is displayed, together with the shot image, on the display part 110. Further, a slide button 362 on the slide bar 361 is vertically moved with the cursor button of the operation part 112, to thereby perform adjustment from no correction to a high degree of correction. For instance, in an example of FIG. 12(a), the slide button 362 is positioned on the side of the high degree of correction, so that the correction is made to reduce the difference in flesh color between the cheek portion 201 and the neck portion 202. Further, in an example of FIG. 12(b), the slide button 362 is positioned in the middle of the high degree of correction and no correction, so that the degree of correction is lower than that in FIG. 12(a), resulting in that a little difference in flesh color between the cheek portion 201 and the neck portion 202 remains. Further, in an example of FIG. 12(c), the slide button 362 is positioned on the side of no correction, so that the correction is not performed, and the difference in flesh color between the cheek portion 201 and the neck portion 202 becomes large.

Note that the application example 3 is the same as the other embodiments except that the correction coefficient calculation part 126 of the control part 108 performs the weighting processing on the coefficients of the color conversion matrix when it calculates the color conversion matrix for converting the color of the face portion into the new-face color.

Further, it is also possible to apply not only the electronic camera 101 but also an image processing program for a computer executing the weighting processing on the coefficients of the color conversion matrix, similar to the previous embodiments.

As above, with the use of the electronic camera 101 and the image processing program according to the present application example 3, it is possible to adjust the degree of correction at the time of performing the color conversion on the flesh color of the face, which enables to obtain a figure image with a face color that suits the user's preference. Note that when there is a large difference in flesh color between the face portion and the portion surrounding the face, it can be generally considered that the person puts on a heavy makeup, so that the electronic camera 101 and the image processing program can also be utilized in an application for judging the degree of heaviness of makeup.

APPLICATION EXAMPLE 4

Next, an application example 4 of the electronic camera 101 and the image processing program described before will be explained. Note that also in the application example 4, the structure of the electronic camera 101 explained in FIG. 1 is the same, and a part of the processing is different. The application example 4 corresponds to the application example 3 described before, in which the weighting coefficients are automatically set in accordance with the degree (contribution degree) of light of the photoflash 113 given to the face portion.

Here, the contribution degree of light of the photoflash 113 can be determined as a difference between a brightness of a face when the photoflash 113 is luminous and a brightness of a face when the photoflash is nonluminous under the same shooting condition (aperture, shutter speed, ISO sensitivity) as that when the photoflash is luminous. For instance, FIG. 13(a) is an example of image in which a night scene is shot with no photoflash and with automatic exposure to achieve an optimum exposure of a face portion. Here, it is assumed that an exposure condition in FIG. 13(a) includes a shutter speed of ⅛, an aperture of F2.8, and a sensitivity of ISO400. Further, FIG. 13(b) is an example of image in which the same night scene as in FIG. 13(a) is shot with photoflash and with automatic exposure to achieve an optimum exposure of the face portion. Here, it is assumed that an exposure condition in FIG. 13(b) includes a shutter speed of ⅟₆₀, an aperture of F2.8, and a sensitivity of ISO50. Further, the brightness (By value, for instance) of the face portion in FIG. 13(b) is set as B1. Note that the brightness of the face portion can be determined from pixel values at a position on the shot image on which the face detection is performed by the face detection part 122.

Here, the brightness of the face portion when shooting is performed with no photoflash (nonluminous) under the same exposure condition as the exposure condition in FIG. 13(b) shot with photoflash, is estimated from the exposure condition at the time of shooting the image in FIG. 13(a). Alternatively, it is also possible to forcibly shoot the same night scene under the same exposure condition as that in FIG. 13(b) to determine the brightness of the face portion, but, since the exposure becomes under and an S/N ratio deteriorates, the correct brightness may not be determined. In this case, a brightness of a face portion in FIG. 13(c) is estimated from the brightness of the face portion of the image in FIG. 13(a) that is shot with no photoflash and with automatic exposure. Note that the brightness can be estimated based on the respective values of the shutter speed, the aperture and the ISO sensitivity. For instance, when the shutter speed is changed from ⅛ in FIG. 13(a) to ⅟₆₀ in FIG. 13(c), the Bv value indicating the brightness increases by three corresponding to three stages of shutter speed. In like manner, it is possible to estimate the Bv value based on the difference in the apertures and the sensitivities. A value obtained as described above by estimating the brightness of the face portion in FIG. 13(c) from the brightness of the face portion of the image in FIG. 13(a) that is shot with no photoflash and with automatic exposure, is set as B2.

As a result of this, since the brightness of the face portion obtained with photoflash and the brightness of the face portion obtained with no photoflash under the same exposure condition including the shutter speed, the aperture and the ISO sensitivity, are B1 and B2, respectively, a contribution degree Cd of light of the photoflash 113 with respect to the brightness of the face portion can be determined as the following (equation 9). Note that although the relation of (B1>B2) is assumed to be satisfied, when an order of subtraction is not considered, it is also possible to set an absolute value of the difference as the contribution degree Cd. Note that (B1>B2) is set to be satisfied.

$$Cd = B1 - B2 \quad \text{(equation 9)}$$

Further, it is also possible to determine a normalized contribution degree Cds as the following (equation 10).

$$Cds = (B1 - B2)/B1 \quad \text{(equation 10)}$$

In the (equation 10), since B2 changes from 0 (black level) to B1 (when light of the photoflash 113 does not reach, B2 equals to B1), the contribution degree Cds takes a value ranging from 0 to 1. Specifically, when the contribution degree Cds is close to 1, an influence of light of the photoflash 113 given to the color of the face is large, and on the other hand, when the contribution degree Cds is close to 0, the influence of light of the photoflash 113 given to the color of the face is small.

Further, the contribution degree Cds is used as the weighting coefficient for the coefficients of the color conversion matrix explained in the application example 3. Accordingly, it is possible to perform a high degree of correction, when there is a large influence of light of the photoflash 113 given to the face, by enlarging the degree of correction to reduce the difference in color between the face portion and the area surrounding the face, and to perform a lower level of correction, where there is a small influence of light of the photoflash 113 given to the face, by reducing the degree of correction to reduce the difference in color between the face portion and the area surrounding the face.

Next, a process of processing for automatically setting the weighting coefficients in accordance with the degree (contribution degree) of light of the photoflash 113 given to the face portion in the electronic camera 101 of the application example 4 will be described using a flow chart in FIG. 14. Here, the flow chart in FIG. 14 corresponds to the flesh color correction processing in the "portrait mode" explained in FIG. 2, but, it differs in that the weighting coefficients of the color conversion matrix are automatically changed in accordance with the degree (contribution degree) of light of the photoflash 113 given to the face portion. Note that in FIG. 14, steps having the same numbers as the step numbers in FIG. 2 indicate the same processing as those of FIG. 2. Further, the judgment whether or not the photoflash shooting is performed is made in step S102 after the shooting is performed in step S101 in FIG. 2, but, in the present application example 4, the judgment whether or not the photoflash shooting is applied is made in step S102 before shooting, based on the exposure state and whether or not the mode is set to a forcible light emission mode. Further, when the photoflash shooting is performed, the process proceeds to step S301, and when it is not performed, the process proceeds to step S113 without performing correction processing.

Hereinafter, processing different from those of FIG. 2 will be described.

(Step S301) The shooting processing part 121 of the control part 108 performs the focus control, the exposure control (exposure control when the photoflash 113 does not emit light) and the like on an image to be shot, and then temporarily stores the image shot by the image sensor 104 in the image buffer 107 (shot image under nonluminous). Note that the processing of step S301 may also be performed after the following step S302.

(Step S302) The shooting processing part 121 of the control part 108 performs the focus control, the exposure control (exposure control when the photoflash 113 emits light), and the like on an image to be shot, and then temporarily stores the image shot by the image sensor 104 in the image buffer 107 (main shooting image).

In the following step S104 and step S105, the same processing as those of FIG. 2 are performed on the main shooting image shot in step S302. Hereinafter, the same processing as those of FIG. 2 are executed until they reach step S109, to thereby form a new-face color. Thereafter, before proceeding to the calculation processing for the color conversion matrix in FIG. 2, processing of the following step S303 is executed.

(Step S303) The correction coefficient calculation part 126 of the control part 108 calculates the contribution degree explained before in FIG. 13, by using the image shot in step S301 when the photoflash 113 is nonluminous and the image shot in step S302 when the photoflash 113 is luminous.

Further, the weighting is performed in accordance with the contribution degree when the color conversion matrix is calculated in the following step S110a.

(Step S110a) The correction coefficient calculation part 126 of the control part 108 calculates the color conversion matrix for converting the color of the face portion into the new-face color in accordance with the contribution degree determined in step S303.

For instance, by using, instead of the four weighting coefficients (a11, a12, a21, and a22) in the (equation 5) to the (equation 8), the contribution degree Cds represented by the (equation 10) as the four coefficients, it is possible to enlarge the weighting coefficients when the contribution degree Cds is large (when the influence of light of the photoflash is large), and meanwhile, it is possible to reduce the weighting coefficients when the contribution degree Cds is small (when the influence of light of the photoflash is small).

Further, the processing of step S111 and subsequent steps after determining the color conversion matrix in step S110a are the same as those of FIG. 2, so that an explanation thereof will be omitted.

Note that it is also possible to apply not only the electronic camera 101 but also a program for a computer executing the same processing as that of FIG. 11, similar to the previous embodiments, in which there is a need to previously shoot the image when the photoflash is nonluminous and store the image in the memory card 111a together with the main shooting image. Alternatively, there is a need to previously add the contribution degree determined at the time of shooting as header information of the main shooting image. After such an operation is performed at the time of shooting, the memory card 111a in which the shot main shooting image and the image when the photoflash is nonluminous (or the main shooting image to which the contribution degree is added as the header information) are stored is coupled to the computer and, instead of executing the processing of steps S102, S301, and S302 in FIG. 14, processing to read out the shot main shooting image and the image when the photoflash is nonluminous (or the main shooting image to which the contribution degree is added as the header information) from the memory card 111a is executed. Thereafter, the processing of step S103 and subsequent steps in FIG. 14 are executed in the computer. Note that it is supposed that an image processing program that performs the processing of step S103 and subsequent steps in FIG. 14 on the images read out from the memory card 111a is previously installed in the computer from a medium that stores the program.

As above, with the use of the electronic camera 101 and the image processing program according to the present application example 4, it is possible to change the degree of correction performed on the flesh color of the face in accordance with the contribution degree of light of the photoflash 113, so that it is possible to avoid a situation where the correction is performed at an extremely high level, and the flesh color of the face can be approximated to a natural flesh color.

APPLICATION EXAMPLE 5

Next, an application example 5 of the electronic camera 101 and the image processing program described before will be explained. Note that also in the application example 5, the structure of the electronic camera 101 explained in FIG. 1 is the same, and a part of the processing is different. The application example 5 corresponds to the application example 4 explained before, in which there is performed the correction that takes into consideration a color tone of the face when the photoflash 113 is nonluminous. Accordingly, it becomes possible to match a color tone of the face when the photoflash 113 is luminous to a natural color tone of the face when the photoflash 113 is nonluminous.

The flesh color correction processing in the "portrait mode" in the electronic camera 101 according to the application example 5 will be described using a flow chart in FIG. 15. The flow chart in FIG. 15 corresponds to the flesh color correction processing in the "portrait mode" explained in FIG. 2, but, it differs in that there is performed the correction in which the color tone of the face when the photoflash 113 is nonluminous is taken into consideration. Note that in FIG. 15, steps having the same numbers as the step numbers in FIG. 2 or FIG. 14 indicate the same processing as those of FIG. 2 or FIG. 14. Further, the judgment whether or not the photoflash shooting is performed is made in step S102 after the shooting is performed in step S101 in FIG. 2, but, in the present application example 5, similar to the application example 4 in FIG. 14, the judgment whether or not the photoflash shooting is applied is made in step S102 before shooting, based on the exposure state and whether or not the mode is set to the forcible light emission mode. Further, when the photoflash shooting is performed, the process proceeds to step S301, and when it is not performed, the process proceeds to step S113 without performing correction processing.

Figure 14:
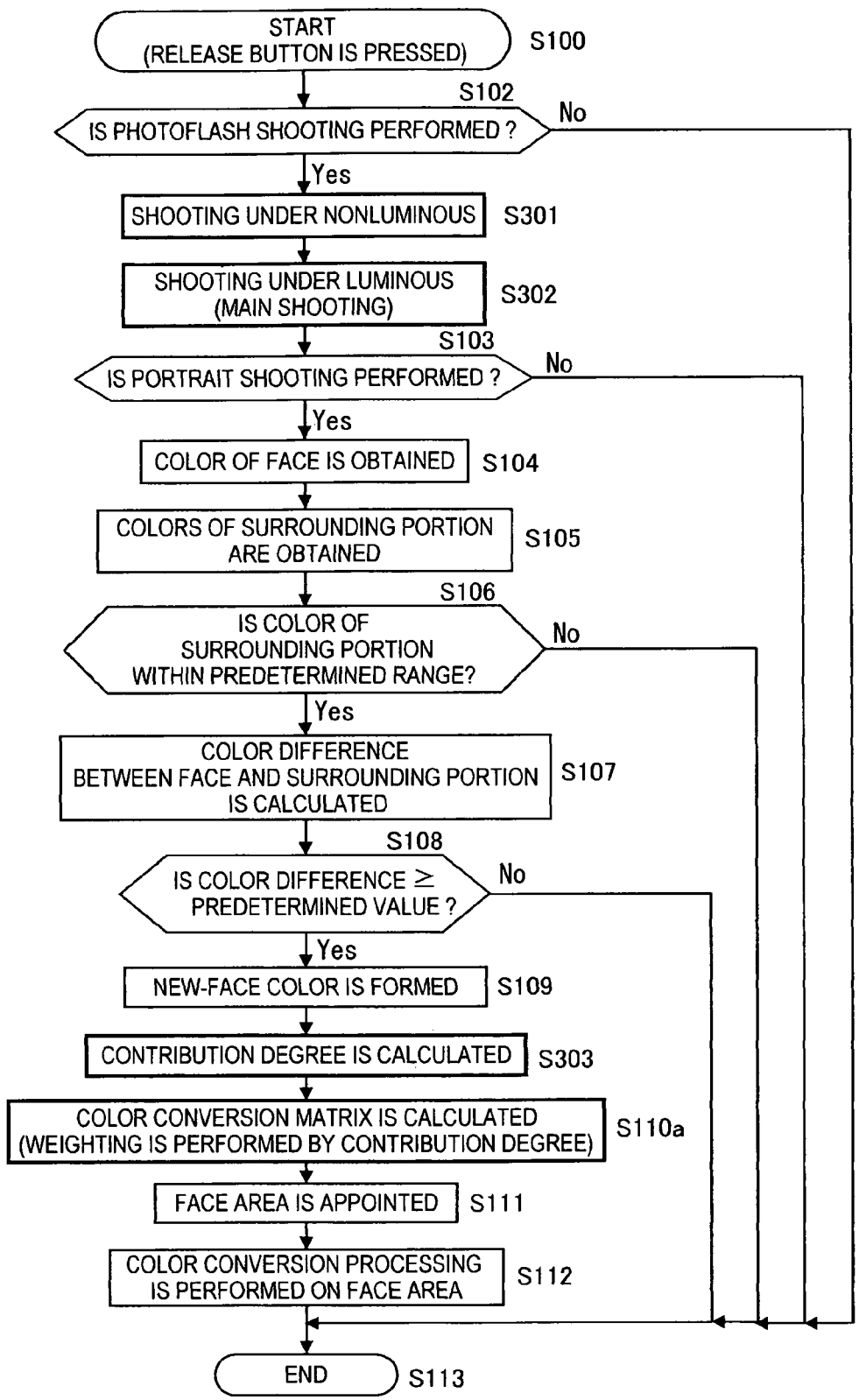
FIG. 14 is a flow chart showing processing in an electronic camera 101 according to an application example 4.
Figure 15:
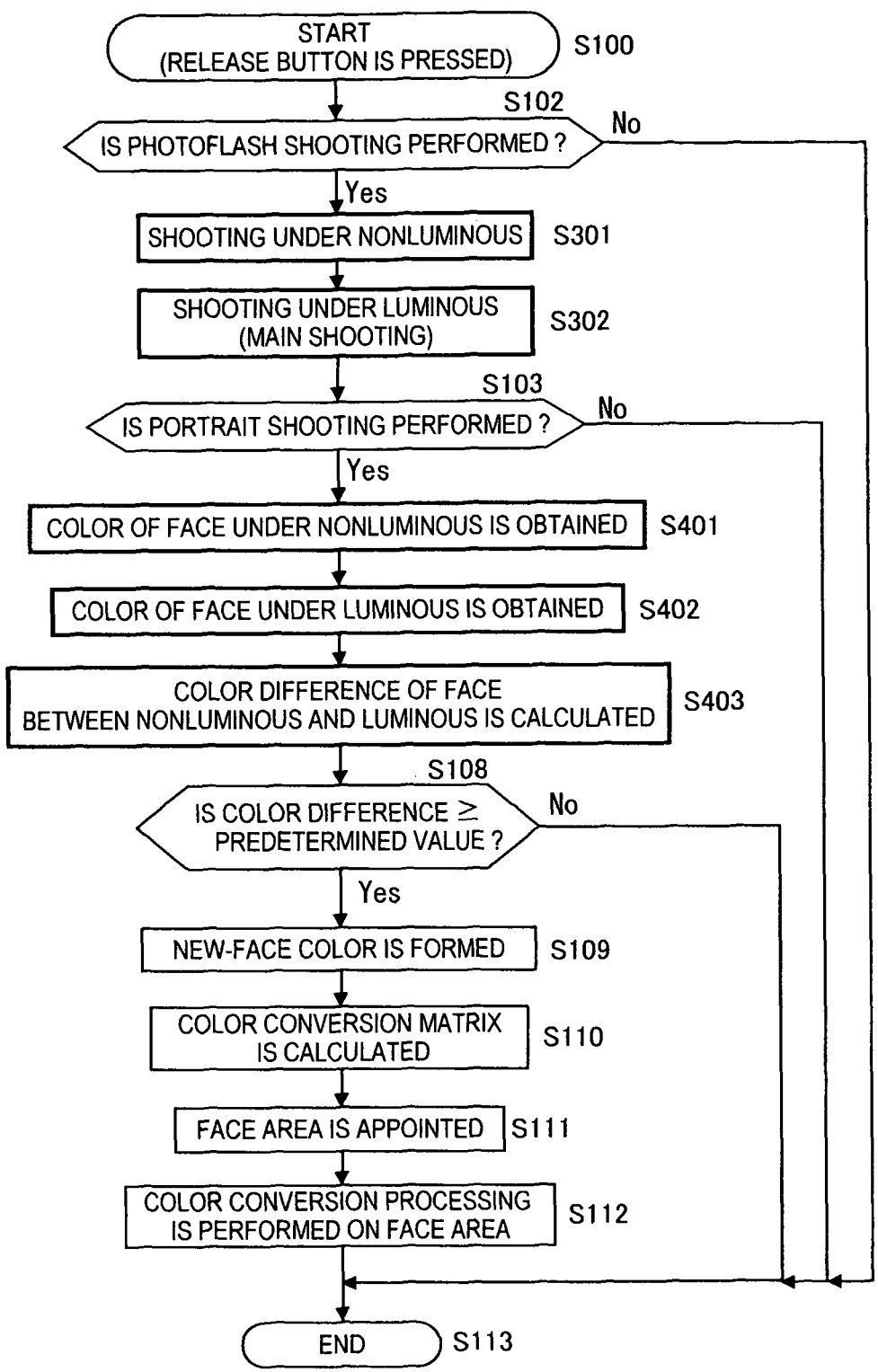
FIG. 15 is a flow chart showing processing in an electronic camera 101 according to an application example 5.

Further, in FIG. 15, processing of step S301 and step S302 are the same processing as those of steps having the same numbers as those in FIG. 14, and the shooting processing part 121 of the control part 108 takes each of the image when the photoflash 113 is nonluminous and the image when the photoflash is luminous (main shooting image) shot by the image sensor 104 in the image buffer 107. Further, the following step S103 corresponds to step S103 in FIG. 2, in which it is judged whether or not the shot images are figure images, and if the images are the figure images, the process proceeds to step S401, and if they are not the figure images, the process proceeds to step S113.

Hereinafter, processing different from those of FIG. 2 will be described.

(Step S401) This processing corresponds to the processing of step S104 in FIG. 2, in which the color of the face of the image shot in step S301 when the photoflash 113 is nonluminous is obtained.

(Step S402) This processing corresponds to the processing of step S104 in FIG. 2, in which the color of the face of the image shot in step S302 when the photoflash 113 is luminous is obtained.

(Step S403) This processing corresponds to the processing of step S107 in FIG. 2, in which the color difference between the color of the face when the photoflash 113 is nonluminous obtained in step S401 and the color of the face when the photoflash 113 is luminous obtained in step S402 is calculated.

Further, the processing of step S108 and subsequent steps after determining the color difference between the color of the face when the photoflash 113 is nonluminous and the color of the face when the photoflash 113 is luminous are the same as those of FIG. 2, so that an explanation thereof will be omitted.

Note that it is also possible to apply not only the electronic camera 101 but also a program for a computer executing the same processing as that of FIG. 15, similar to the previous embodiments, in which there is a need to previously shoot the image when the photoflash is nonluminous and store the image in the memory card 111a together with the main shooting image, similar to the application example 4. After such an operation is performed at the time of shooting, the memory card 111a in which the shot main shooting image and the image when the photoflash is nonluminous are stored is coupled to the computer and, instead of executing the processing of steps S102, S301, and S302 in FIG. 15, processing to read out the shot main shooting image and the image when the photoflash is nonluminous from the memory card 111a is executed. Thereafter, the processing of step S103 and subsequent steps in FIG. 15 are executed in the computer. Note that it is supposed that an image processing program that performs the processing of step S103 and subsequent steps in FIG. 15 on the images read out from the memory card 111a is previously installed in the computer from a medium that stores the program.

As above, with the use of the electronic camera 101 and the image processing program according to the present application example 5, there is performed the correction in which the color tone of the face when the photoflash 113 is nonluminous is taken into consideration, so that it is possible to match the color tone of the face when the photoflash 113 is luminous to the natural color tone of the face when the photoflash 113 is nonluminous.

APPLICATION EXAMPLE 6

Next, an application example 6 of the electronic camera 101 and the image processing program described before will be explained. Note that also in the application example 6, the structure of the electronic camera 101 explained in FIG. 1 is the same, and a part of the processing is different. The application example 6 corresponds to the above-described embodiment and application examples, in which the correct correction can be performed even when the face portion of the image shot with the light emission of the photoflash 113 is saturated. Note that it is generally known that when an image is shot with RGB (red, green, blue), G is most likely to be saturated. Accordingly, in the present application example, when G in the face portion is saturated, it is estimated from the color of the portion surrounding the face (neck, decollete, shoulder, and the like).

Figure 16:
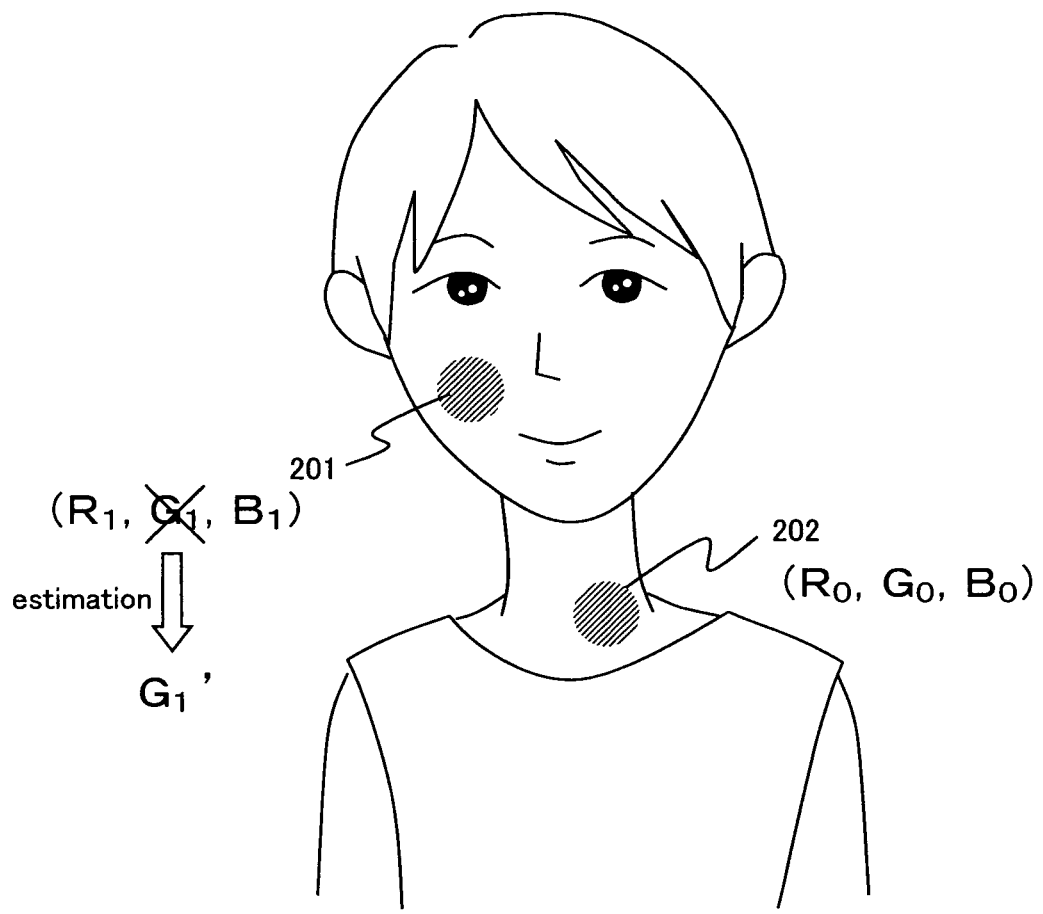
FIG. 16 is an auxiliary view for explaining estimation processing of a color when it is saturated.

FIG. 16 is a view for explaining the processing to estimate, when the cheek portion 201 of the face is saturated, the color of the cheek portion 201 by using the color of the neck portion 202. In FIG. 16, it is assumed that an RGB value of the cheek portion 201 is (R1, G1, B1), and an RGB value of the neck portion 202 is (R0, G0, B0). Further, it is supposed that G1 of the cheek portion 201 is saturated by the light of the photoflash 113. In this case, R1 and B1 are not saturated. Further, it is supposed that the RGB value (R0, G0, B0) of the neck portion 202 is also not saturated. Note that the saturation indicates a state in which, for example, if each data of RGB is represented by 8-bit gradations (256 gradations from 0 to 255), the data indicates the value of 255.

Here, from the RGB value (R0, G0, B0) of the neck portion 202, a ratio between R and G (R0/G0) and a ratio between B and G (B0/G0) are determined. Further, these ratios are applied to R1 and B1 of the cheek portion 201, to thereby determine Gr1' and Gb1', respectively. If Gr1' and Gb1' are different, an average value of Gr1' and Gb1' is set as an estimated value G1' of G1 of the cheek portion 201, for instance. As above, the value of saturated G1 of the cheek portion 201 can be estimated.

Figure 17:
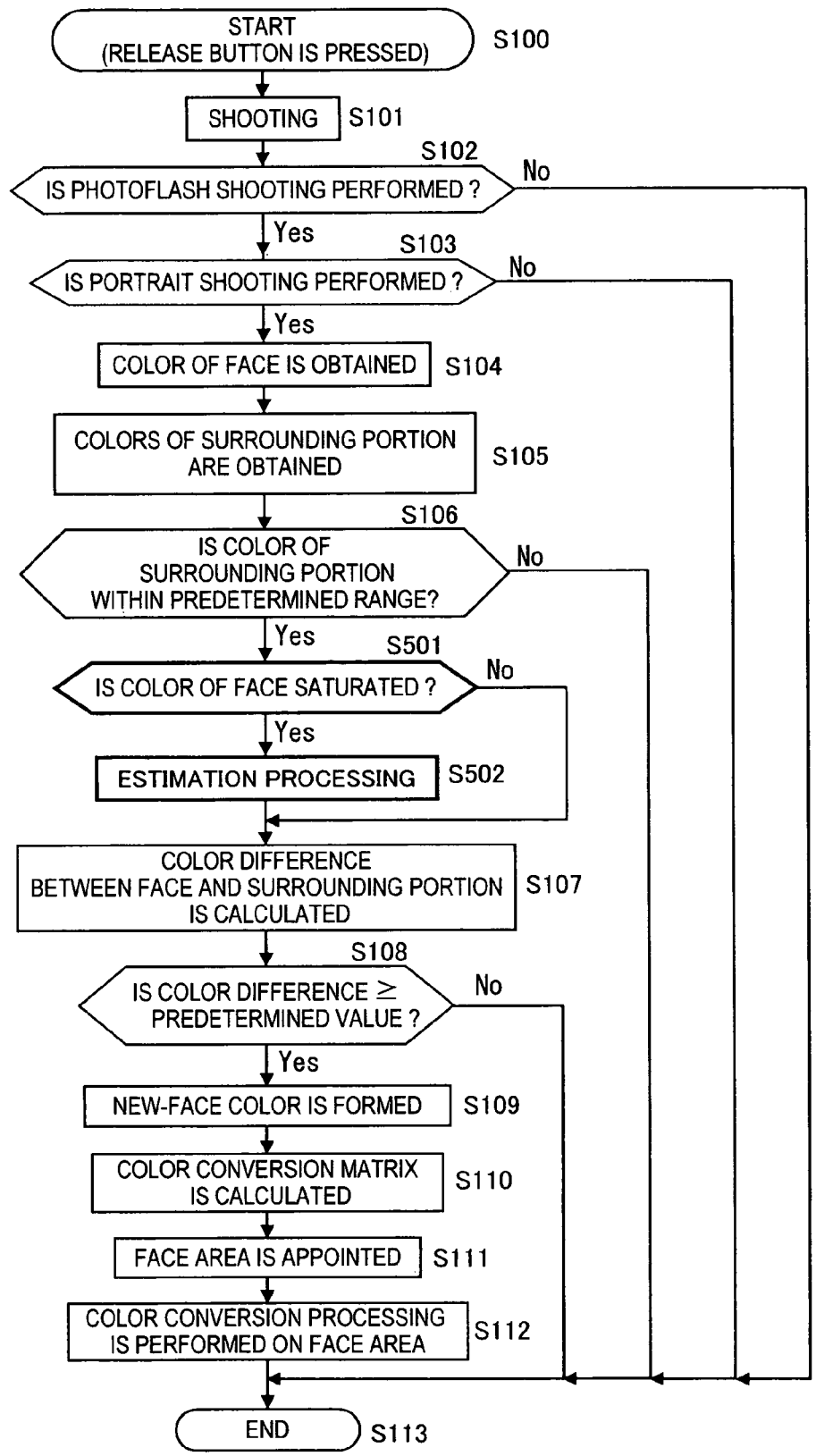
FIG. 17 is a flow chart showing processing in an electronic camera 101 according to an application example 6.

Note that the aforementioned processing is only required to be performed between step S104 and step S107 during which the color of the face is obtained and, as shown in FIG. 17, for example, step S501 and step S502 are executed right before step S107.

(Step S501) It is judged whether or not the saturation occurs based on the color of the face obtained in step S104. When the saturation occurs, the process proceeds to step S502, and when it does not occur, the process proceeds to step S107. Note that the judgment whether or not the saturation occurs is as described before. Further, when the saturation does not occur (when the process proceeds to step S107), the exact same processing as that of the flow chart in FIG. 2 is performed.

(Step S502) When it is judged that the face portion is saturated in step S501, the estimation processing of the color of the face portion is carried out. Note that the estimation processing is as described above in FIG. 16.

As above, when the color of the face portion is saturated, the estimation processing of the saturated color is conducted, so that even when the face portion of the image shot with the light emission of the photoflash 113 is saturated, the correct correction can be performed.

APPLICATION EXAMPLE 7

Next, an application example 7 of the electronic camera 101 and the image processing program described before will be explained. Note that also in the application example 7, the structure of the electronic camera 101 described in FIG. 1 is the same, and a part of the processing is different. In the above-described embodiment and application examples, the processing to approximate the color of the face to the color of the portion surrounding the face is explained, but, the application example 7 can be applied to a case where color tones of two portions, which are not limited to the face and the portion surrounding the face, are made to be the same.

Figure 18:
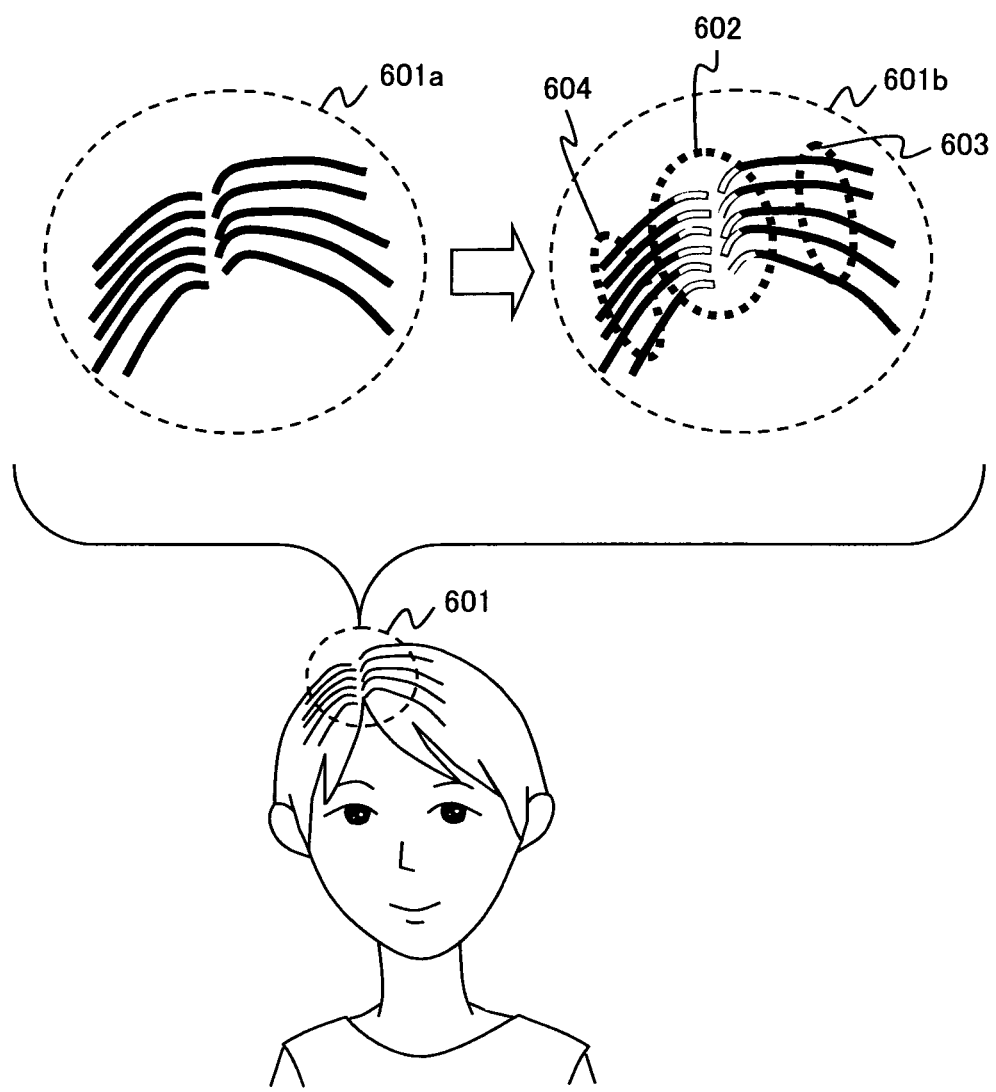
FIG. 18 is an auxiliary view for explaining a processing method in an application example 7.

For instance, FIG. 18 shows an example in which the processing of the electronic camera 101 and the image processing program described before is applied to hair. As shown in FIG. 18, when a hair dye and the like are applied to hair, original hair appears on a hair line, a parting portion 601 and the like in accordance with the growth of the hair, resulting in that the hair color becomes to look uneven. For example, the entire hair has the same color right after the application of hair dye as shown by a dashed line circle 601a in FIG. 18, but, when the hair grows, original hair appears on a hair line portion 602 as shown by a dashed line circle 601b in FIG. 18.

Accordingly, in the processing of the electronic camera 101 and the image processing program according to the application example 7, a color of the hair line portion 602 is used as the color of the face portion and colors of front portions 603, 604 being not the hair line portion as the colors of the portion surrounding the face in the above-described embodiment and application examples. Accordingly, it is possible to approximate the hair color of the hair line portion 602 to the colors of the front portions 603, 604.

Note that the extraction of hair can be realized by making use of the face detection processing performed by the face detection part 122 of the control part 108. For instance, since the outline of the face can be detected through the face detection processing, it can be seen that there is the hair above the detected face portion. Further, the detection of hair line portion can be realized by extracting, from a hair portion, a portion whose color is extremely changed. Note that it is also possible to design such that the processing is not executed when there is no portion whose color is extremely changed, and the processing is executed only when there is the portion whose color is extremely changed.

As above, although the processing to approximate the color of the face to the color of the portion surrounding the face is described, the application example 7 can be applied to a case where color tones of two portions, which are not limited to the face and the portion surrounding the face, are made to be the same.

As above, the electronic camera 101 and the image processing program according to the present invention have been described by citing examples in the respective embodiments, but, the present invention can be embodied in other various forms without departing from the spirit or essential characteristics thereof. The above embodiments are therefore to be considered in all respects as illustrative and not restrictive. The present invention is indicated by the scope of appended claims, and in no way limited by the text of the specification. Moreover, all modifications and changes that fall within the equivalent scope of the appended claims are deemed to be within the scope of the present invention.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:
1. An electronic camera, comprising:
an imaging part shooting a figure image;
an area detection part detecting, from the figure image shot by the imaging part, a flesh-colored area including a face portion and a portion other than a face;
a color judgment part judging color information of the flesh-colored area detected by the area detection part;
a color difference calculation part determining a color difference between first color information of the face por- tion and second color information of the flesh-colored area of the portion other than the face which are judged by the color judgment part;
a correction coefficient calculation part determining color correction coefficients based on the color difference determined by the color difference calculation part;
an area appointment part appointing an area on which a color conversion is performed; and
a color conversion part performing, when the color difference determined by the color difference calculation part is equal to or greater than a predetermined value at a time of performing the color conversion on the area appointed by the area appointment part, the color conversion on the area appointed by the area appointment part by using the color correction coefficients, wherein
the color conversion part executes processing of the color conversion when a photoflash part is on, in which the photoflash part emits light at a time of shooting in the imaging part, and
the correction coefficient calculation part performs, at a time of determining the color correction coefficients, the weighting on the color correction coefficients in accordance with a contribution degree with respect to the face portion when the photoflash part is luminous.

2. The electronic camera according to claim 1, wherein
the flesh-colored area other than the face from which the color judgment part judges the second color information is an area surrounding a neck of a person.

3. The electronic camera according to claim 1, further comprising
a color range judgment part judging whether or not a hue of at least one of the first color information and the second color information is within a predetermined range, wherein
the color conversion part executes, in the case the photoflash part is on at the time of shooting by the imaging part, the processing of the color conversion when a judgment result of the color range judgment part indicates that the hue is within the predetermined range.

4. The electronic camera according to claim 1, wherein
the color judgment part determines, in the case the photoflash part is on at the time of shooting by the imaging part, color information being high-frequency from a color distribution of the flesh-colored area other than the face at a time of judging the second color information, and sets the color information as the second information of the flesh-colored area other than the face.

5. An electronic camera, comprising:
an imaging part shooting a figure image;
an area detection part detecting, from the figure image shot by the imaging part, a flesh-colored area including a face portion and a portion other than a face;
a color judgment part judging color information of the flesh-colored area detected by the area detection part;
a color difference calculation part determining a color difference between first color information of the face portion and second color information of the flesh-colored area of the portion other than the face which are judged by the color judgement part;
a correction coefficient calculation part determining color correction coefficients based on the color difference determined by the color difference calculation part;
an area appointment part appointing an area on which a color conversion is performed;
a color conversion part performing, when the color difference determined by the color difference calculation part is equal to or greater than a predetermined value at a time of performing the color conversion on the area appointed by the area appointment part, the color conversion on the area appointed by the area appointment part by using the color correction coefficients; and
a storage part storing the color information of the flesh-colored area judged by the color judgment part with respect to the figure image previously shot by the imaging part as preset color information, wherein
the color conversion part executes processing of the color conversion when a photoflash part is on, in which the photoflash part emits light at a time of shooting in the imaging part; and
the color difference calculation part determines a color difference between main shooting color information of a flesh-colored area and the preset color information stored in the storage part, the main shooting color information of the flesh colored area being judged by the color judgment part with respect to a figure image obtained through main shooting in the imaging part.

6. The electronic camera according to claim 5, wherein
the storage part stores color information of a flesh-colored area judged by the color judgment part with respect to a figure image being shot when the photoflash part is nonluminous as the preset color information, and
the color conversion part executes processing of the color conversion in a case a photoflash part is on in which the photoflash part emits light at a time of shooting in the imaging part.

7. A non-transitory computer-readable medium storing an image processing program capable of being executed by a computer, comprising:
an imaging step shooting a figure image;
an area detection step detecting, from the figure image, a flesh-colored area including a face portion and a portion other than a face;
a color judgment step judging color information of the flesh-colored area detected in the area detection step;
a color difference calculation step determining a color difference between first color information of the face portion and second color information of the flesh-colored area of the portion other than the face which are judged in the color judgment step;
a correction coefficient calculation step determining color correction coefficients based on the color difference determined in the color difference calculation step;
an area appointment step appointing an area on which a color conversion is performed;
a color conversion step performing, when the color difference determined in the color difference calculation step is equal to or greater than a predetermined value at a time of performing the color conversion on the area appointed in the area appointment step, the color conversion on the area appointed in the area appointment step by using the color correction coefficients; and
a storage step storing the color information of the flesh-colored area judged by the color judgment step with respect to the figure image previously shot by the imaging step as preset color information, wherein
the color conversion step executes processing of the color conversion when a photoflash part is on, in which the photoflash part emits light at a time of shooting of the figure image, and
the color difference calculation step determines a color difference between main shooting color information of a flesh-colored area and the preset color information stored in the storage step, the main shooting color information of the flesh colored area being judged by the color judgment step with respect to a figure image obtained through a main shooting in the imaging step.

* * * * *